United States Patent [19]

Ma et al.

[11] Patent Number: 5,305,424
[45] Date of Patent: Apr. 19, 1994

[54] DATA FORMING METHOD FOR A MULTI-STAGE FUZZY PROCESSING SYSTEM

[75] Inventors: Xiwen Ma; Hongmin Zhang; Weidong Xu, all of Santa Clara, Calif.

[73] Assignee: Apt Instruments (N.A.) Inc., Santa Clara, Calif.

[21] Appl. No.: 558,315

[22] Filed: Jul. 26, 1990

[51] Int. Cl.⁵ .................... G05B 13/00; G06F 9/44
[52] U.S. Cl. .................................... 395/51; 395/3; 395/900; 395/11
[58] Field of Search .................. 395/3, 11, 61, 51, 900

[56] References Cited

U.S. PATENT DOCUMENTS

| | | | |
|---|---|---|---|
| 4,839,823 | 6/1989 | Matsumoto | 364/513 |
| 4,864,490 | 9/1989 | Nomoto et al. | 364/157 |
| 5,165,011 | 11/1992 | Hisano | 395/54 |
| 5,191,638 | 3/1993 | Wakami et al. | 395/51 |

FOREIGN PATENT DOCUMENTS 0292286 11/1988 European Pat. Off. ...... G05B 13/02

OTHER PUBLICATIONS

Hirota, et al., "Fuzzy Flip-Flop as a Basis of Fuzzy Memory Modules," Fuzzy Computing, 1988, 173–183.
Schildt, H., Artificial Intelligence Using C, Osborne McGraw-Hill, 1987, 74–76, 81–91.
Stone, H. S., High Performance Computer Architecture, Addison-Wesley, 1987, 102–117.
Togai et al., "A Fuzzy Logic Chip and a Fuzzy Inference Accelerator for Real–Time Approximate Reasoning", Proc. 17th Intt. Sym. Multiple Valued Logic, May 1987, 25–29.
Dettloff et al., "A Fuzzy Logic Controller with Reconfigurable, Cascadable Architecture", Proc. 1989 IEEE Conf. on Computer Design, 1989 474–478.

Patent Abstracts of Japan–Unexamined Applications, Jun. 26, 1989.

Primary Examiner—Allen R. MacDonald
Assistant Examiner—Robert W. Downs
Attorney, Agent, or Firm—Dickstein, Shapiro & Morin

[57] ABSTRACT

A fuzzy inference system and its method of operation. The system comprises an inference unit (30) of pipeline architecture, a control unit (20) for controlling the operation of the inference unit, and a host computer (10) for supervising the entire operation. A plurality of inference rule groups (referred to as rule cells) each for controlling an object to be controlled are stored in a rule memory (22) of the control unit (20). The rule cell is composed of a number of path codes. The path code includes object data to be processed and operation codes. The operation codes are to control each of processing/operation sections (31 to 35) of the inference unit (30). After the host computer has set a rule cell address for designating a rule cell in the rule memory (22) to a rule cell address register (23) in order to execute an inference, when a path address counter (24) is started, path addresses are outputted from the counter (24) in sequence, so that path codes within the designated rule cell are read and supplied to the inference unit in sequence. The inference unit executes a fuzzy inference by a pipeline processing method on the basis of the supplied path codes. Timing signals are fed to each of the processing/operation sections (31 to 35) from a controller (21). When an inference end signal is applied to the host computer via the controller, the host computer reads the inference results from an output buffer (35), designates a succeeding rule cell for executing a succeeding inference, and starts the path address counter (24) again.

10 Claims, 16 Drawing Sheets (1)     x3 = NS  ⟶  y1 = NM
                                    RULE 1
(2)     x5 = PM  ⟶  y1 = NM (3)     x2 = NL  ⟶  y1 = NL
                                    RULE 2
(4)     x4 = NM  ⟶  y1 = NL (5)     x3 = PL  ⟶  y1 = PL (6)     x2 = PM  ⟶  y1 = PL         RULE 3

(7)     x5 = NL  ⟶  y1 = PL

.
.
.

(m-2)   x1 = ZR  ⟶  y1 = NL (m-1)   x5 = PS  ⟶  y1 = NL         RULE 4

|  IV CODE  | OP CODE |||| 
|---|---|---|---|---|
|  | OP 1 | OP 2 | OP 3 | OP 4 |

FIG. 8

| | IV<br>CODE | ... | OP2<br>SE | OP3<br>SE | OP4 |
|---|---|---|---|---|---|
| (1) | x3 | ... | 10 | 00 | 0 |
| (2) | x5 | ... | 01 | 11 | 1 |
| (3) | x2 | ... | 10 | 00 | 0 |
| (4) | x4 | ... | 01 | 10 | 0 |
| (5) | x1 | ... | 10 | 00 | 0 |
| (6) | x5 | ... | 00 | 00 | 0 |
| (7) | x4 | ... | 01 | 01 | 1 |
| (m-2) | x3 | ... | 10 | 00 | 0 |
| (m-1) | x2 | ... | 00 | 00 | 0 |
| (m) | x5 | ... | 01 | 11 | 1 |
| (m+1) | (END CODE) | | 10 | 11 | ... |

| SUBRULE NO. | NODE SEQ. | STAGE 0 | STAGE 1 | STAGE 2 | STAGE 3 |
|---|---|---|---|---|---|
| P1  | (1 1 1 1)   | 1(x3) | 1(NS)  | 1(R1) | 1(NM) |
| P2  | (1 1 2 2)   | 2(x5) | 2(PM)  | 1(R1) | 1(NM) |
| P3  | (2 2 3 3)   | 3(x2) | 3(NL)  | 2(R2) | 2(NL) |
| P4  | (2 2 4 4)   | 4(x4) | 4(NM)  | 2(R2) | 2(NL) |
| P5  | (3 3 5 1)   | 1(x3) | 5(PL)  | 3(R3) | 3(PL) |
| P6  | (3 3 6 3)   | 3(x2) | 6(PM)  | 3(R3) | 3(PL) |
| P7  | (3 3 7 2)   | 2(x5) | 7(NL)  | 3(R3) | 3(PL) |
| P8  | (2 4 8 5)   | 5(x1) | 8(ZR)  | 4(R4) | 2(NL) |
| P9  | (2 4 9 2)   | 2(x5) | 9(PS)  | 4(R4) | 2(NL) |
| P10 | (2 4 10 4)  | 4(x4) | 10(PL) | 4(R4) | 2(NL) |

| SORTED PATH No. | NODE SEQUENCE | STAGE 0 | STAGE 1 | STAGE 2 (MIN) | (OP2) | STAGE 3 (MAX) | (OP3) |
|---|---|---|---|---|---|---|---|
| S1 | (1 1 1 1) | 1(x3) | 1(NS) | 1(R1) | (1,0) | 1(NM) | (0,0) |
| S2 | (1 1 2 2) | 2(x5) | 2(PM) | 1(R1) | (0,1) | 1(NM) | (1,1) |
| S3 | (2 2 3 3) | 3(x2) | 3(NL) | 2(R2) | (1,0) | 2(NL) | (0,0) |
| S4 | (2 2 4 4) | 4(x4) | 4(NM) | 2(R2) | (0,1) | 2(NL) | (1,0) |
| S5 | (2 4 8 5) | 5(x1) | 8(ZR) | 4(R4) | (1,0) | 2(NL) | (0,0) |
| S6 | (2 4 9 2) | 2(x5) | 9(PS) | 4(R4) | (0,0) | 2(NL) | (0,0) |
| S7 | (2 4 10 4) | 4(x4) | 10(PL) | 4(R4) | (0,1) | 2(NL) | (0,1) |
| S8 | (3 3 5 1) | 1(x3) | 5(PL) | 3(R3) | (1,0) | 3(PL) | (0,0) |
| S9 | (3 3 6 3) | 3(x2) | 6(PM) | 3(R3) | (0,0) | 3(PL) | (0,0) |
| S10 | (3 3 7 2) | 2(x5) | 7(NL) | 3(R3) | (0,1) | 3(PL) | (1,1) |

FIG. 22

DATA FORMING METHOD FOR A MULTI-STAGE FUZZY PROCESSING SYSTEM

BACKGROUND OF THE INVENTION

1. Field of the Invention

The present invention relates to a fuzzy inference (or approximate inference or reasoning) system.

2. Description of Related Art

Conventional fuzzy inference systems have so far not been able to switch inference rule groups at high speeds when inferences are being executed. Therefore, a high-speed inference system has executed the inference processing in accordance with a rule group corresponding to a single task.

In spite of the fact that an ordinary binary-type computer can execute so-called multitask processing, no inference system which can execute multitask processing has been so far realized. Since many objects to be controlled do not necessarily require high speed inference processing, a high speed inference system, cannot use all of its capabilities.

On the other hand, pipeline processing methods have been adopted for conventional binary computers as a method of realizing high speed operation, through utilizing a special architecture. However, since control codes for controlling pipeline processing and the object data to be processed are frequently supplied to the pipeline processing system at different timings, a waiting time often results in the processing means based on the delay between the pipeline control code and the object data. In addition, since the control codes and object data to be processed are supplied externally, these codes and data may not be supplied at the appropriate timings for the process. Further, the waiting time often occurs in the pipeline system when the time at which the processed result is outputted, is delayed. The above-mentioned problems may thereby arise when an inference system is used in a pipeline architecture or format.

In fuzzy inference systems, a number of membership functions are determined in accordance with an inference rule group. Therefore, when input values are given, function values of the membership functions corresponding to input values (the degree to which the input values belong to the membership functions and referred to as adaptability or truth values) can be obtained. In conventional fuzzy inference systems, however, since the membership functions are fixedly set to the hardware construction or the function values of the membership functions are stored in a memory unit, it is difficult to alter, without undue time and labor, the fixedly determined membership functions or to improve the tuning flexibility in the membership functions. Further, when various membership functions required for inference processing are stored in a memory unit, the sheer amount of data in the memory unit will become increasingly large.

When the inference system is adapted to a pipeline control architecture, it becomes extremely important to supply data suitable for that architecture. It also is necessary to construct the system in such a way that the reduction in waiting time can be optimized to increase throughput.

Methods of transforming arithmetic operation programs executed by a microcomputer into data suitable for pipeline control processing are well known. An example of such a method is disclosed in Japanese Patent Application Kokai Publication No. 64-66734. However, this method cannot transform rule groups that are usable for fuzzy inference processing into a data form that is suitable for a pipeline architecture. This is because, in contrast to microcomputer instructions, fuzzy rules are different from each other in the number and sort of input variables for the antecedent and therefore are not suitable for the pipeline architecture which is based on uniform instructions. As a result, a problem exists in applying and adapting fuzzy inference processing to a pipeline architecture in order to improve the inference speed.

SUMMARY OF THE INVENTION

An object of the present invention is to provide an inference control apparatus and method which can switch a plurality of inference rule groups and therefore can realize multitask processing.

Another object of the present invention is to provide a pipeline processing apparatus and method which can optimally reduce processor waiting time.

It is still another object of the present invention to provide a truth value generating apparatus and method which can reduce memory capacity and freely set any given membership functions.

It is an other object of the present invention to provide an apparatus and method which can form data that is suitable for pipeline processing in a fuzzy inference mode.

An inference control apparatus of the present invention is provided for controlling an inference apparatus for executing operation processing in accordance with rules given in a predetermined sequence. The control apparatus comprises: a memory means for storing a plurality of rule cells, each cell being composed of a group of rules; a rule cell address setting means for outputting a rule cell address which designates a predetermined rule cell within the memory means; a rule reading means for sequentially reading the rules included in the rule cell designated by the rule cell address setting means, in a predetermined sequence; and a control means for setting a rule cell address to designate a succeeding rule cell to be processed next by the inference apparatus (to the rule cell address setting means) and starting the rule reading means, in response to an inference end signal generated by the inference apparatus.

A method of the present invention is also provided for controlling an inference apparatus for executing operation processing in accordance with rules given in a predetermined sequence. The method aspects of this invention involves the steps of storing a plurality of rule cells each composed of a group of rules in a memory; designating a rule cell to be processed by the inference apparatus, reading rules in the designated rule cell in a predetermined sequence continuously, and supplying the read rules to the inference apparatus; and repeating the designation of a succeeding rule cell to be processed next by the inference apparatus and the reading of rules in the designated rule cell in response to an inference end signal generated by the inference apparatus.

According to one aspect of the present invention, a plurality of rule cells are previously stored in a memory, and the control means sets a rule cell address for designating a rule cell to be processed by the inference apparatus to the rule cell address setting means, and starts the rule reading means. Therefore, it is possible to switch the rule cells or the rule groups to be processed at high speeds. The above switching process is executed whenever a single inference in accordance with one rule cell has been completed, so that all the inferences can be achieved in accordance with all the rule cells previously stored in the memory. When a single inference in accordance with a single rule cell is considered as a single task, it is possible to execute multitask inference processing. That is, if a high speed processing apparatus is adopted for the above inference apparatus, it is possible to bring the ability of the high speed inference apparatus into its full capability.

A pipeline processing apparatus of the present invention is also shown. The apparatus consist of a plurality of processing means arranged in the order of processing in accordance with the electrical connection relationship, a temporal memory means is connected to a front stage of each of the processing means, for temporarily storing data to be supplied to corresponding processing means and to be transferred to a rear stage processing means, a data storing means for arranging and storing in a predetermined sequence a plurality of composite data, each of which is composed of object data to be processed an operation codes for controlling operations of said processing means, a data reading means for reading the composite data in sequence from the data storing means and supplying the read data to said temporal memory means of the first stage, and a timing signal generating means for generating timing signals to control timings when data are read by the data reading means and when data are latched by the temporal memory means at each stage in such a way that predetermined data or code in a composite data or data formed by said front stage processing means is transferred in sequence from the temporal memory means for the processing means at the front stage to the temporal memory means at the rear stage.

Preferably, the processing means at the final stage is a memory means for storing in sequence data formed by the processing means of the front stage whenever each processing step has been completed.

A pipeline processing method forming the present invention is also provided for operating a pipeline construction processing apparatus including a plurality of processing means arranged in the order of processing in electrical connection relationship, and a data latching means, connected to a front stage of each of the processing means, for temporarily storing data to be given to the corresponding processing means and to be transferred to the rear stage processing means. The method involves the steps of first forming composite data composed of object data to be processed and operation codes for controlling operations of the processing means. A second step then involves arranging and storing the composite data in a predetermined processing sequence; and then reading the composite data beginning from the head of the arranged composite data in a predetermined processing sequence to supply the read data to the data latching means at the first stage.

As described above, the composite data is formed by pairing object data to be processed and operation codes for controlling the operation of the processing procedure. Therefore, it is possible to store a pair of object data to be processed and operation codes in the storing means together, thus reducing the processing time as a whole and simplifying the object data and operation code handling. Further, since the object data to be processed or the results data obtained at the preceding-stage processing means are supplied to the present-stage processing means together with the operation code for controlling the present processing means, it is possible to eliminate the waiting time required to receive the operation code for the processing means, thus increasing the processing speed for each processing means. Further, since a buffer memory is provided at the final stage of the processing means, a series of final processed results can be stored in this buffer memory and outputted simultaneously to an external system when the entire processing sequence has been completed, thus facilitating a synchronized operation between the pipeline processing apparatus and the external system.

The invention further provides for a truth value generating apparatus which comprises a memory means for storing basic functions of several kinds; an operating means for operating and outputting a function value corresponding to an input value in accordance with a function obtained by shifting a function designated by a function designating data and stored in the memory means along an input variable axis on the basis of a location designating data.

A method of generating a truth value is also provided according to the present invention which comprises the step of storing basic functions of several kinds in a memory; shifting a function designated by a function designating data and stored in the memory along an input variable axis on the basis of a location designating data; and operating and outputting a function value corresponding to an input value in accordance with the obtained function.

According to the present invention, since a plurality of basic functions of different sorts are stored in the memory, a basic function can be designated by a function designating data and the designated basic function can be shifted on the input variable axis on the basis of location designating data, it is possible to form a great number of membership functions of different sorts in spite of a small memory capacity.

Preferably, the operating means forms a single membership function by shifting two functions designated by two function designating data along the input variable axis on the basis of two location designating data, respectively and by synthesizing these two functions. The operating means then outputs a function value in accordance with the synthesized membership function.

Further, it is preferable to additionally provide a means for providing weight to the function values outputted from the operating means. Therefore, it is possible to freely designate and change the shapes of the membership functions and set any given membership functions.

More preferably, the table look-up method is adopted, and the truth value generating apparatus is constructed by a special hardware architecture in order to increase the truth value (function value) generating speed.

Further, it is also possible to store in the memory means such a basic function that input values are outputted as they are as function values. In this case, when the inputs are truth values, it is possible to output these input truth values as they are by the same apparatus.

A data forming apparatus of the present invention is further provided for forming rules supplied to an inference system comprising a plurality of processing means arranged in a predetermined sequence in such a way that outputs of the front-stage processing means are inputted to the rear-stage processing means. The apparatus comprises a means for dividing each of the plurality of given rules into unit rules and a means for rearranging the divided unit rules according to the sort of processing executed by the final stage processing means and, iteratively, according to the sort of processing executed by the processing means which is arranged one stage before the final stage, and repeating reversely toward the frontmost stage processing means until no rearranging operation is required.

Preferably, the data forming apparatus is further provided with means for transforming the rearranged unit rules into control codes suitable for controlling the processing means.

A method of the present invention is also provided for forming data supplied to an inference system, comprising a plurality of processing means arranged in a predetermined sequence in such a way that outputs of the front-stage processing means are inputted to the rear-stage processing means. The method comprises the steps of dividing each of a plurality of given rules into unit rules and rearranging the divided unit rules according to the sort of processing executed by the final stage processing means and, iteratively, according to the sort of processing executed by the processing means which is arranged one stage before the final stage, and repeating reversely toward the frontmost stage processing means until no rearranging operation is required.

Preferably, the method of forming data further comprises the step of transforming the rearranged unit rules into control codes suitable for controlling the processing means for each group and subgroup corresponding to the processing means.

A data forming apparatus for an inference system of the present invention is further provided. The apparatus comprises: a means for dividing each of a plurality of rules into unit rules, respectively; a means for transforming the divided unit rules into node sequence data, connected by nodes for each stage processing; and a means for rearranging the node sequence data into a sequence group to be processed simultaneously.

Preferably, the data forming apparatus further comprises a means for transforming the rearranged node sequence data into other form data on the basis of the regularity of the processing sequence.

A method of forming data for an inference system is also provided according to the present invention which comprises the steps of: dividing each of a plurality of rules into unit rules, respectively; transforming the divided unit rules into node sequence data, connected by nodes for each stage processing; and rearranging these node sequence data into a sequence group to be processed simultaneously.

Preferably, the method of forming data further comprises the step of transforming the rearranged node sequence data into other form data on the basis of the regularity of the processing sequence.

A data forming apparatus of the present invention is also provided for forming codes, supplied to an inference system comprising a plurality of processing means arranged in a predetermined sequence in such a way that outputs of the front-stage processing means are inputted to a rear-stage processing means to control the processing means. The apparatus comprises: means for rearranging a plurality of data sequences from a processing standpoint at a predetermined processing means, and, iteratively, from a processing standpoint at a processing means arranged before the predetermined processing means, and repeating the above rearranging operations reversely toward the frontmost stage processing means until no rearranging operation is required; and means for transforming the rearranged data sequences into small-bit control codes on the basis of a regularity of the processing sequence.

According to the present invention, a method of forming data supplied to an inference system comprising a plurality of processing means arranged in a predetermined sequence in such a way that outputs of front-stage processing means are inputted to rear-stage processing means to control the processing means is provided. The method comprises the steps of rearranging a plurality of data sequences from a processing standpoint at a predetermined processing means, and, iteratively, from a processing standpoint at a processing means arranged before the predetermined processing means, and repeating the above rearranging operations reversely toward the frontmost stage processing means until no rearranging operation is required; and transforming the rearranged data sequences into small-bit control codes on the basis of a regularity of the processing sequence.

According to the present invention, a plurality of given rules to be processed are divided into unit rules, the divided rules are transformed into node sequence data, and the node sequence data are rearranged in sequence in the order suitable for processing by the processing means arranged in a pipeline structure. Since the data so arranged in sequence as to be most suitable for processing are supplied to the processing means, it is possible to increase the inference speed and the throughput of the inference system. Further, since inference rules inputted by the user at random are rearranged in accordance with a predetermined regulation and further transformed into a predetermined representation form, the contents of the rules are easy to understand. Further, since the node sequence data are compressed data, it is possible to reduce the circuit scale of each processing means based on the pipeline control method.

BRIEF DESCRIPTION OF THE DRAWINGS

FIGS. 4 and 5 are illustrations for assistance in explaining a fuzzy inference process, in which FIG. 4 shows the processing concerning antecedents and FIG. 5 shows the processing with regard to consequents, respectively;

FIG. 7 is an illustration showing a rule group divided into subrules and then rearranged;

FIG. 8 is a format of operation code;

FIG. 9 is a practical example of the operation codes of a rule group shown in FIG. 7;

FIG. 18 shows an example of an inputted rule group;

FIG. 19 shows an example of a rule group divided into subrules;

FIG. 22 shows sorted node sequences; and

DETAILED DESCRIPTION OF THE PREFERRED EMBODIMENTS

The present invention will be described in detail hereinbelow by taking the case where the invention is applied to a system for executing fuzzy inferences (or approximate inferences) of Modus Ponens.

(1) Summary of Fuzzy Inference

A fuzzy inference according to a Modus Ponens is often expressed in the form of an "if, then" statement, as follows:

If $x3=NS$ and $x5=PM$, then $y1=NM$ where "if $x3=NS$ and $x5=PM$" is referred to as "antecedent", and "then $y1=NM$" is referred to as "consequent".

The above rule can be simplified as follows:

Rule 1

$$x3=NS, x5=PM \rightarrow y1=NM$$

In the same way, an example of three other rules can be expressed as:

Rule 2

$$x2=NL, x4=NM \rightarrow y1=NL$$

Rule 3

$$x3=PL, x2=PM, x5=NL \rightarrow y1=PL$$

Rule 4

$$x1=ZR, x5=PS, x4=PL \rightarrow y1=NL$$

Where $xi$ ($i=1, 2, 3, 4, 5, \ldots, M$) denotes the input variable and $yi$ denotes the output variable. Further, NL, NM, NS, ZR, PS, PM and PL are linguistic information (referred to as labels, hereinafter) representative of membership functions, which imply:
NL: Negative Large
NM: Negative Medium
NS: Negative Small
ZR: Approximately Zero
PS: Positive Small
PM: Positive Medium
PL: Positive Large In the above rules, the sequence of the input variables is not regular. However, there exists no problem because these variables are rearranged in an optimum sequence as described later.

The membership functions represent a degree to which the input variables belong to a fuzzy set, and any given functions can be adopted for the membership functions. Here, the above-mentioned seven functions of NL to PL are taken into account (in this embodiment, however, the membership functions of the antecedent can be formed into any given forms by five parameters and set to any desired locations on the input variable axis, as described later). The function values (grades) of the membership functions lie within a range between 0 and 1.

Figure 1:
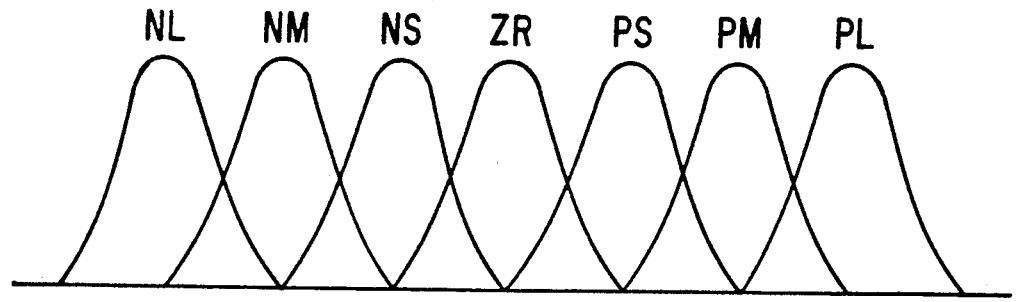
FIGS. 1 and 2 are graphical representations showing examples of membership functions.
Figure 2:
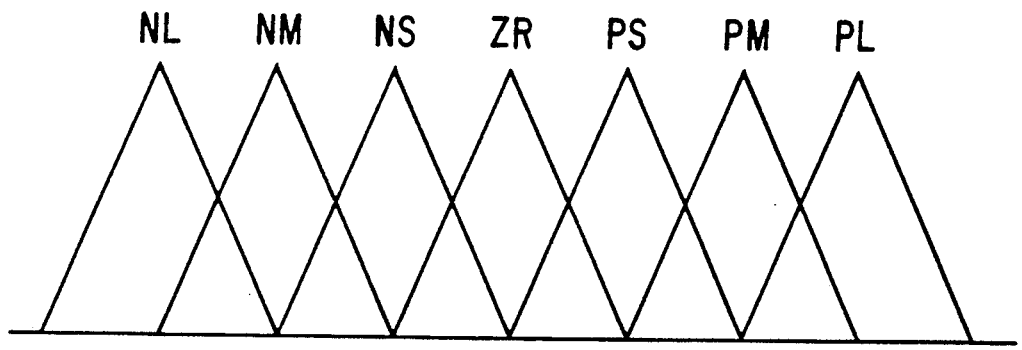
Figure 3:
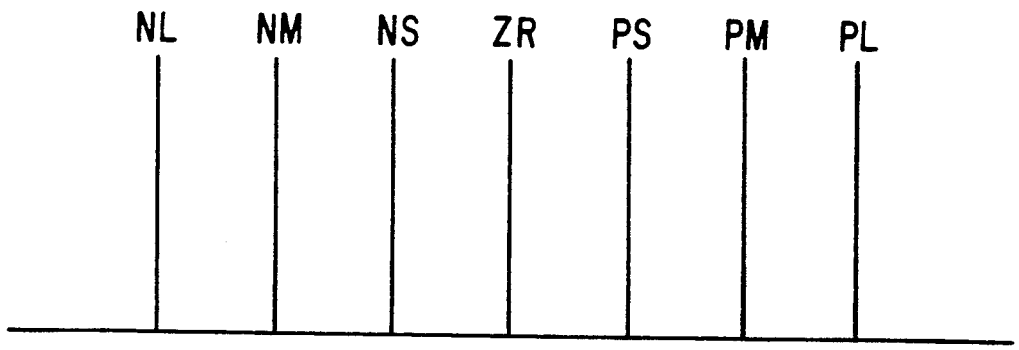
FIG. 3 is a graphical representation showing membership functions in the form of a singleton.

FIGS. 1 to 3 show examples of the membership functions.

FIG. 1 shows the aforementioned seven membership functions expressed in the form of a normal (Gaussian) distribution.

FIG. 2 shows examples of the same functions simplified in the form of a triangular shape.

FIG. 3 shows examples of the same functions expressed in the form of a singleton. These singleton expressions are suitable for representing membership functions of the consequent of the rule. In this case, it is possible to extremely simplify the operation for obtaining defuzzified final results.

Figure 4:
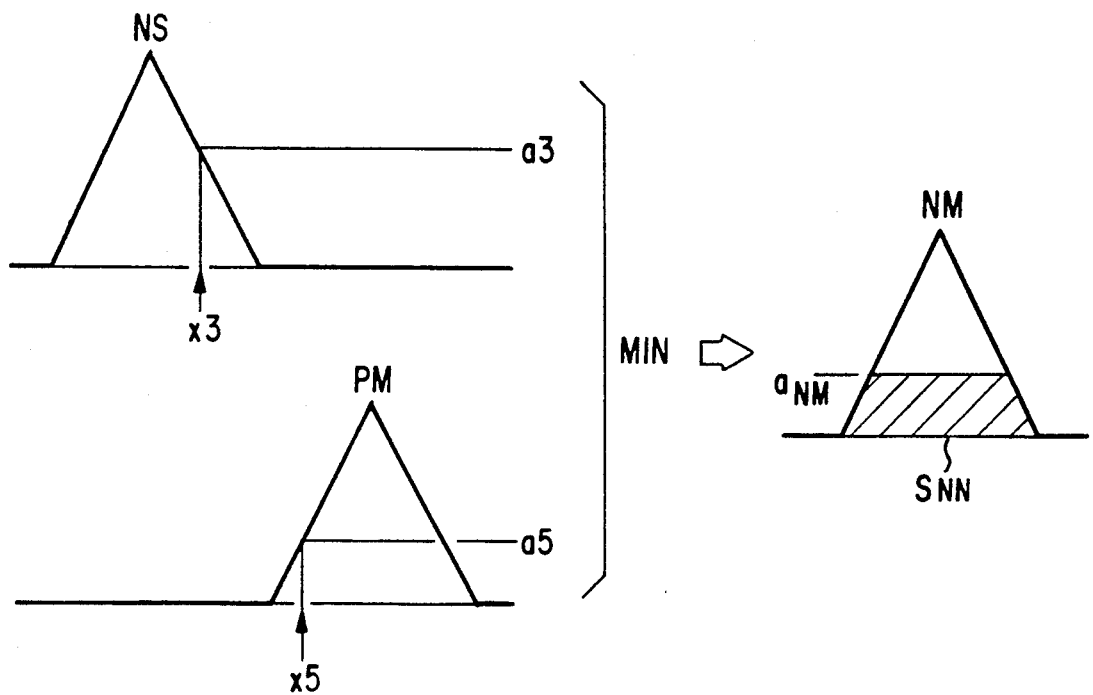

FIG. 4 shows a fuzzy inference process according to rule 1, in which triangular membership functions are shown for simplification.

In FIG. 4, when an input $x3$ is given, a function value (referred to as the truth value) $a3$ of the membership function NS can be obtained. In the same way, a truth value $a5$ of the membership function PM at an input $x5$ can be obtained.

Then, a MIN operation (for selecting the smallest one) of these truth values $a3$ and $a5$ is executed. The executed MIN operation result is expressed as $a_{NM}$.

A MIN operation (truncation) between the membership function NM of the consequent of the rule 1 and the MIN operation result $a_{NM}$ is executed to obtain a membership function $S_{NM}$ as shown by the shaded portion in FIG. 4.

In the same way, fuzzy inferences are executed for all the other rules (inclusive of rules 2 to 4).

The membership functions of the consequents of the rules 2 and 4 are both NL. In such a case, a MAX operation (for selecting the largest one) between an inference operation result $a_{NL1}$ of the antecedent of the rule 2 and an inference operation result $a_{NL2}$ of the antecedent of the rule 4 is executed to obtain a MAX operation result $a_{NL}$. Further, a MIN operation (truncation) between this MAX operation result $a_{NL}$ and the membership function NL is executed to obtain a result $S_{NL}$.

Figure 5:
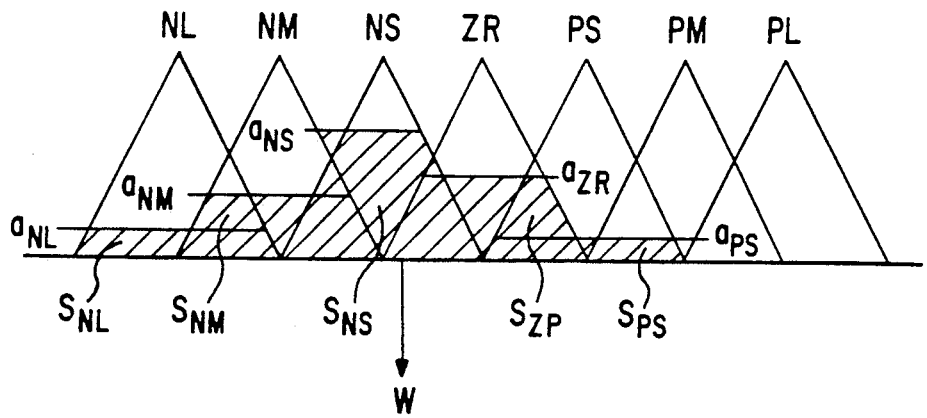

Finally, a MAX operation among the inference operation results $S_{NL}$, $S_{NM}$, $S_{NS}$, $S_{ZR}$ and $S_{PS}$ of all the rules obtained as described above is executed as shown in FIG. 5 to obtain a final result (the results $S_{PM}$ and $S_{PL}$ are zero). A final defuzzified value W can be obtained by defuzzifying the final result (which represents fuzzy information) by calculating a center of gravity thereof, for instance. This final defuzzified value W is outputted as an output $y1$.

Where the membership functions of the consequents of rules are represented by singletons, the final defuzzified value W can be obtained by the following equation:

$$W = \sum_{k=NL}^{PL} C_k \cdot a_k / \sum_{k=NL}^{PL} a_k \quad (1)$$

where $C_k$ denotes the weight coefficient representing a singleton, and k=NL to PL.

(2) System Configuration

Figure 6:
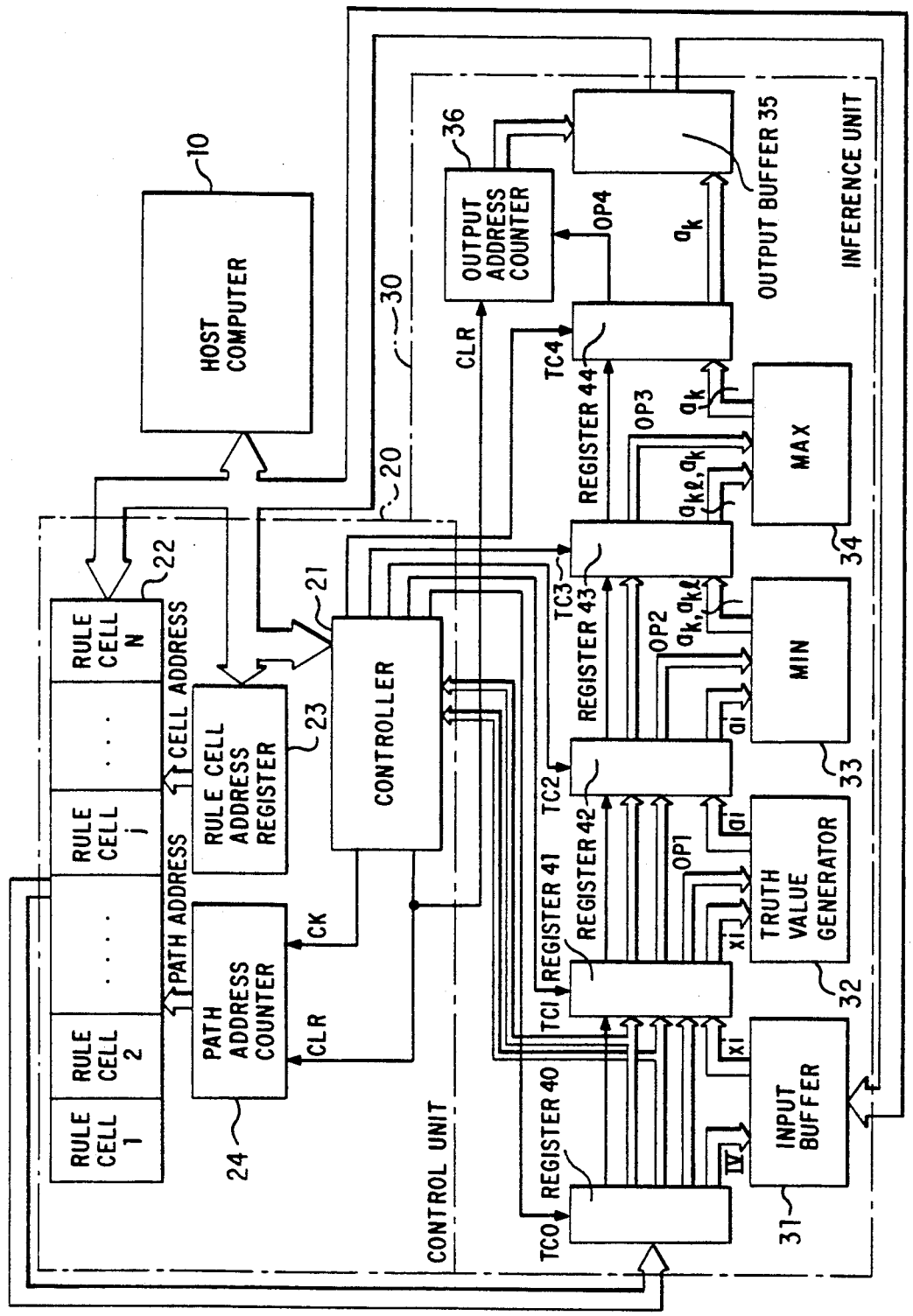
FIG. 6 is a block diagram showing the fuzzy inference system configuration.

FIG. 6. shows the entire fuzzy inference system configuration. This system comprises an inference unit 30 for obtaining inference operation results $a_k$ (k=NL to PL) with respect to the antecedents in accordance with such rules as above-mentioned and on the basis of pipeline processing; a control unit 20 for supplying path codes, each including data to be operated on and an operation code ("OP code") for controlling operations, to the inference unit 30 in sequence and further for controlling timings for various operations executed in the inference unit 30; and a host computer 10 for supervising the entire system operation.

The inference unit 30 comprises buffer registers 40, 41, 42, 43 and 44 for transferring data to be operated or operation result data and OP codes in sequence in synchronism with timing signals TC0, TC1, TC2, TC3 and TC4; an input buffer 31, a truth value generator 32, a MIN operation section 33 and a MAX operation section 34 all being interposed between two registers, respectively; an output buffer 35 for holding the final operation result $a_k$; and an output address counter 36 for designating memory addresses in the output buffer 35.

The control unit 20 comprises a rule memory 22 for storing a plurality of rule cells (N cells in this embodiment); a rule cell address register 23 for generating cell addresses to designate rule cells in the rule memory 22, respectively; a path address counter 24 for generating path addresses to designate path codes (subrules) in each rule cell, respectively; and a controller 21 for generating the timing signals TCO to TC4 and controlling the path address counter 24 and the output address counter 36.

The host computer 10 is connected to the rule cell address register 23, the rule memory 22 and controller 21 in the control unit 20, and further to the input buffer 31 and the output buffer 35 in the inference unit 30 via a system bus (including an address bus, a data bus and control lines).

(3) Path Codes

The aforementioned rules 1 to 4 are only an example of rules with respect to the output variable y1. There exist other rules with respect to the output variable y1 in general.

The fuzzy inference system can execute multitask processing for a plurality of output variables yj (j=1 to N). A plurality of rules (i.e. a rule group) are predetermined for each output variable yj. In this embodiment, a rule group with respect to one output variable is referred to as a rule cell. For example, a rule cell 1 implies a set of all rules determined for the output variable y1.

Path codes will be explained hereinbelow by taking the case of rules with respect to the output variable y1 included in the rule cell 1 for simplification.

Each rule can be divided into subrules whose number is the same as that of the input variables. For instance, the aforementioned rule 1 is divided into two subrules as follows:

x3=NS →y1=NM x5=PM →y1=NM

In the same way, all the rules with respect to the output variable y1 are divided into subrules, respectively.

Further, the divided subrules are arranged in a predetermined sequence. Although described in further detail later, here the arrangement sequence is only explained as follows: the subrules are so arranged that the consequent membership functions are in the order of NL, NM, NS, ZR, PS, PM and PL. FIG. 7 shows the case where the subrules are arranged in a predetermined sequence, in which the subrules are designated by reference numerals (l) to (m) for convenience.

Path codes can be formed on the basis of these subrules. One path code can be obtained from one subrule.

FIG. 8 shows a format of a path code composed of an IV code and an OP code. Further, the OP code is composed of four codes: OP1, OP2, OP3 and OP4.

The IV code is a code for designating the input variables, that is, an address of the input buffer 31 in the inference unit 30, in practice.

The code OP1 includes codes (p1, p2, q1, and q2 described later) for designating a membership function in the truth value generator 32 and a parameter (CW, described later) used to calculate a truth value.

The code OP2 controls the operation of the MIN operation section 33 in the inference unit 30, and is composed of a start bit S and an end bit E.

The code OP3 controls the operation of the MAX operation section 34 in the inference unit 30, and is also composed of a start bit S and an end bit E.

The code OP4 is a single bit code for incrementing the output address counter 36 in the inference unit 30. However, the code OP4 is presented here to systemize the explanation. In practice, the E bit of OP3 is used instead, because OP4 is identical to the E bit of OP3, as shown in FIG. 7.

FIG. 9 shows an example of a series of path codes transformed from a series of subrules shown in FIG. 7. The arrangement sequence of these path codes is the same as that of the subrules. In FIG. 9, the IV code is shown only as xi, and the code OP1 is omitted. The codes OP2, OP3 and OP4 and the operation of the sections 33, 34 and 36 controlled by these codes, respectively will be described in further detail later.

An end code (shown by the number (m+1)) is shown at the endmost position of the path code sequence. The end code controls the controller 21 in the control unit 20 so as to output a clear signal CLR. This clear signal CLR serves to reset the path address counter 24 and the output address counter 36. In the end code, only two codes OP2 and OP3 are significant and fixed to (1 0) and (1 1), respectively. Further, a combination of these codes (1 0) and (1 1) will not exert an influence upon the operation of the MIN operation section 33 and the MAX operation section 34. The other IV code and operation codes OP1 and OP4 in the end code are insignificant and therefore are predetermined in such a way as to exert no influence upon the input buffer 31, the truth value generator 32 and the output address counter 36.

The rule cell 1 comprises a set of path codes with respect to the output variable y1 as shown in FIG. 9 and these path codes are formed by the host computer 10 and transferred via the bus to be previously stored in an area of the rule cell 1 in the rule memory 22. In the same way, rule cells 2 to N composed of path code sets are formed with respect to other output variables y2 to yN, and stored in the corresponding areas in the rule memory 22, respectively.

In this embodiment, each rule cell is formed for each output variable. However, it is possible to form a rule cell including rules with respect to two or more output variables. In this case, it is preferable that the path codes are arranged in a predetermined sequence with respect to the output variables.

(4) Control Unit

Figure 10:
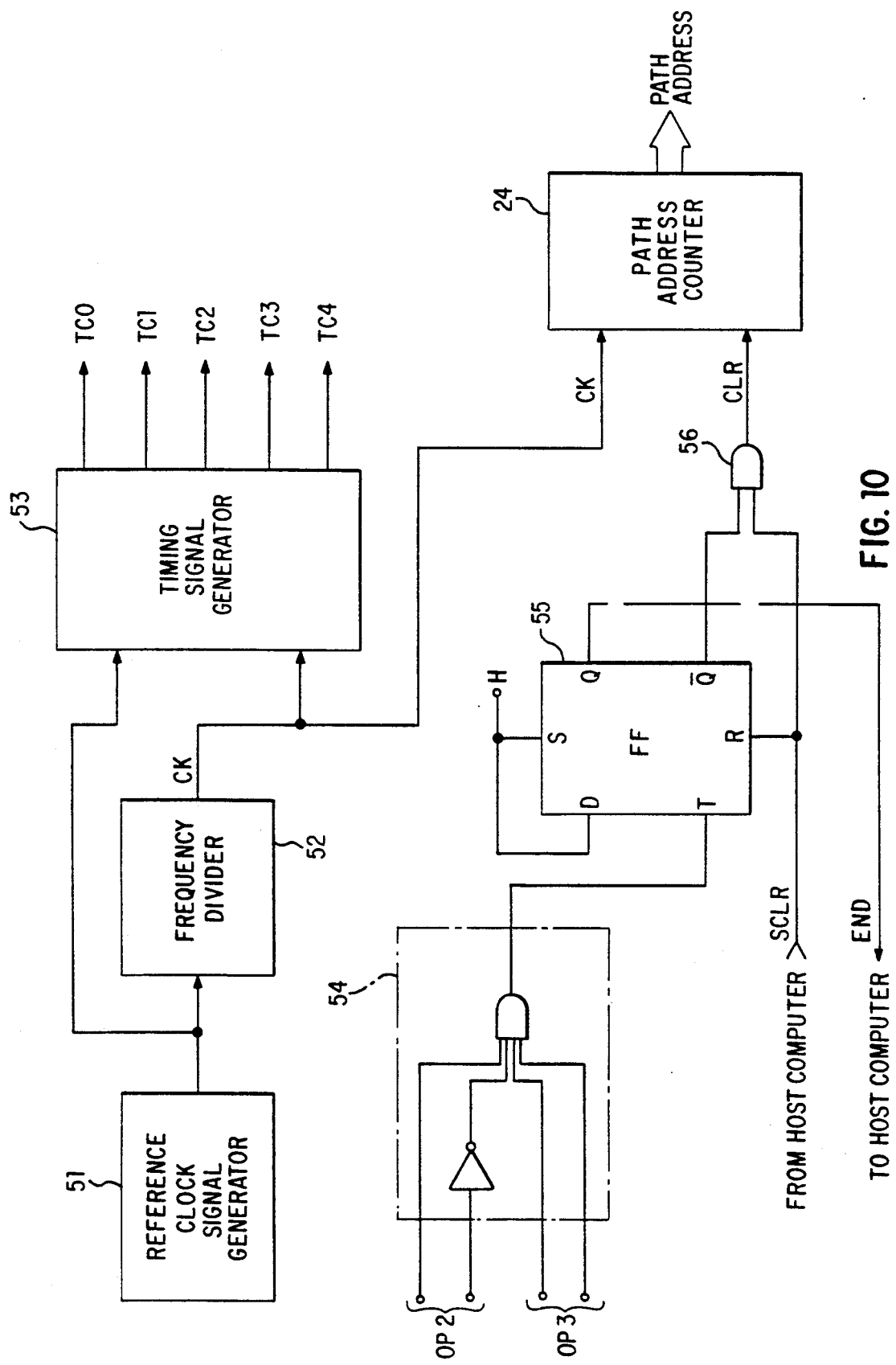
FIG. 10 is a block diagram showing an example of the controller configuration.

FIG. 10 shows a construction of the controller 21 in the control unit 20. Further, FIG. 11 shows a timing chart for assistance in explaining the operation of the entire system including the controller 21.

Figure 11:
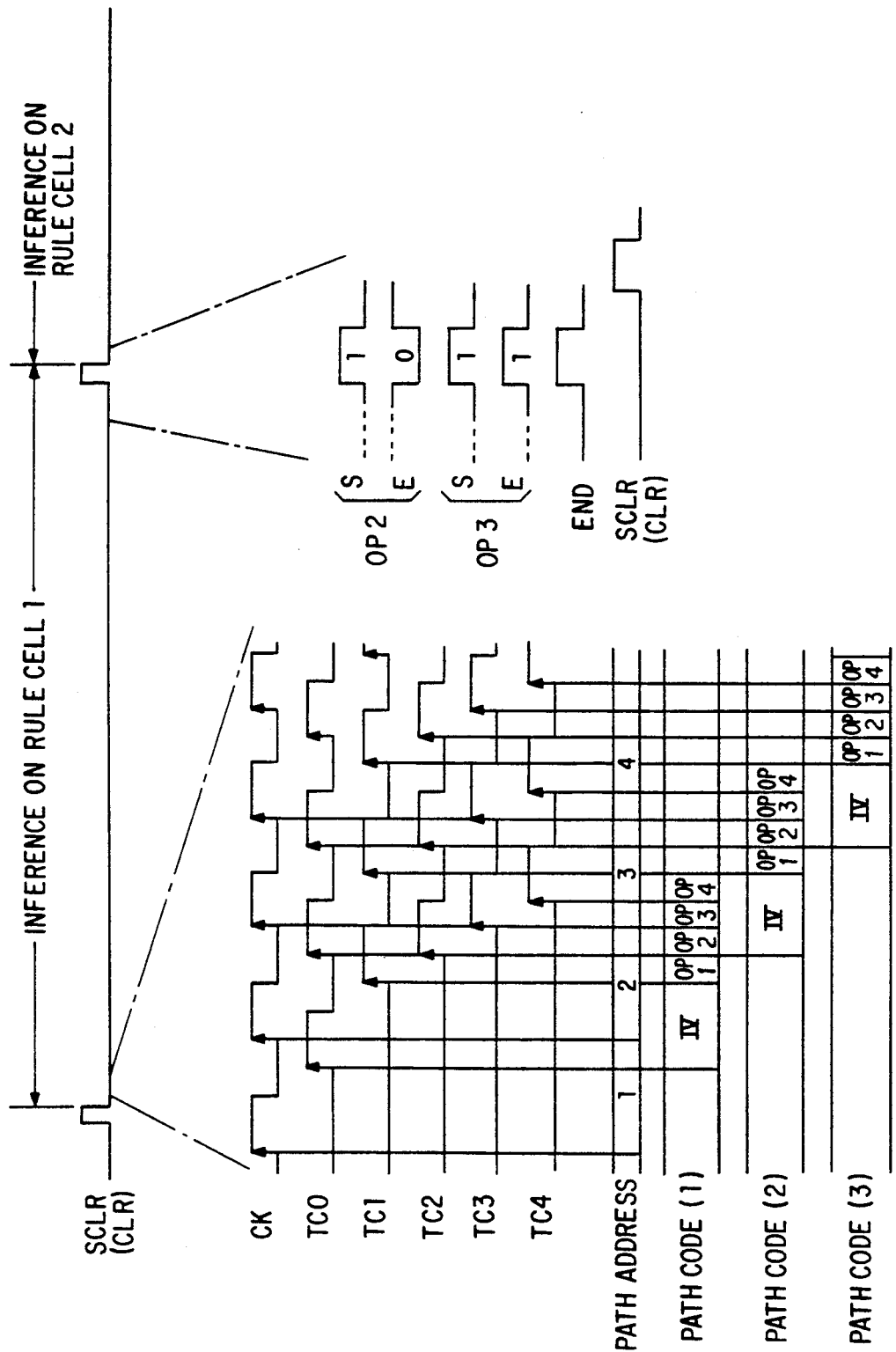
FIG. 11 is a timing chart for assistance in explaining the inference processing operation.

With reference to FIGS. 10-11, the controller 21 is provided with a reference clock generator 51 for outputting a reference clock signal (e.g. 16 MHz) to a timing signal generator 53 and a frequency divider 52. The frequency divider 52 divides a frequency of the reference clock signal into ¼, for instance, and outputs a clock signal CK (e.g. 4 MHz). This clock signal CK is applied to the timing signal generator 53 and the path address counter 24. The timing signal generator 53 includes a plurality of shift registers and generates five timing signals TC0 to TC4 by shifting the input clock signal CK by suitable steps in the shift registers in response to the reference clock signal, respectively.

The controller 21 includes a DT flip-flop 55. A high (H) level signal is applied to a data input terminal of this DT flip-flop 55. The DT flip-flop is reset when a system clear signal SCLR is applied from the host computer 10 to a reset terminal R of the DT flip-flop 55 via a bus (not shown), so that the inversion output Q is set to a high level "H". Since the inversion output Q of the H level and the system clear signal SCLR are applied to an AND gate 56, when the DT flip-flop 55 is reset, the output (the clear signal CLR) of the AND gate 56 is set to an H level, so that the path address counter 24 is reset (cleared to zero) by the H level clear signal CLR. The counter 24 begins to count the inputted clock signals CK after having been reset. The count output signal of this counter 24 is a path address signal. The clear signal CLR is also applied to the output counter 36 of the inference unit 30 to reset (zero clear) this counter 36.

The controller 21 is further provided with an end code detector 54 to which codes OP2 and OP3 of the end code are fed. When these codes OP2 and OP3 are (1 0) and (1 1), fed respectively, the end code detector outputs an H level detection signal to a clock input terminal T of the DT flip-flop 55, so that the DT flip-flop is set and therefore the non-inversion output Q is set to an H level. This H level output Q is applied to the host computer 10 via the bus as a inference end signal END.

In response to this inference end signal END, the host computer 10 recognizes that inference processing in accordance with the one rule cell has been completed, and outputs the system clear signal SCLR again in order to start inference processing in accordance with the succeeding rule cell. In response to the signal SCLR, the DT flip-flop 55 is reset and therefore the address counters 24 and 36 are both reset as already described.

(5) Entire System Operation (Multitask Processing)

With reference to FIG. 6, the host computer 10 previously stores a plurality of rule cells formed as described above at the corresponding areas in the rule memory 22. When inference processing in accordance with the rule cell 1 is required, the host computer 10 sets an address (e.g. the head address) of the area where the rule cell 1 is stored to the rule cell address register 23 via the bus.

Thereafter, the host computer 10 outputs the system clear signal SCLR to reset the path address counter 24 (and the output address counter 36), so that the counter 24 begins to count the number of clock signals CK and to output path address signals incremented sequentially. In response to the path address signals, path codes in the rule cell 1 are read beginning from the first path code in sequence and then supplied to the inference unit 30. The timing signals TC0 to TC4 generated from the controller 21 are also applied to the inference unit 30. The inference unit 30 executes inference processing in accordance with the applied path codes in synchronism with the timing signals TC0 to TC4 as described in further detail later. The inference results $a_k$ are stored in the output buffer 35 in sequence.

When an end code included at the end of a series of path codes is read, and further the codes OP2 and OP3 of the end code are inputted to the controller 21 (via the register 40), the inference end signal END is generated as described already and applied to the host computer 10.

In response to this end signal END, the host computer 10 reads the inference result $a_k$ (k=NL to PL) stored in the output buffer 35 via the bus. Further, when additional inference processing in accordance with the rule cell 2 is required to be executed, the host computer 10 sets an address of an area of the rule cell 2 in the rule memory 22 to that of rule cell address register 23, and outputs the system clear signal SCLR. In response to this signal, the counter 24 and the counter 36 are both reset, so that the counter 24 begins to count the clock signals CK again to output the path address signals. In response to the path address signals, the path codes of the rule cell 2 are read in sequence and then fed to the inference unit 30 to execute an inference in accordance with the rule cell 2 in the same way.

When the host computer 10 reads the inference results $a_k$ (the inference results with respect to the antecedent) from the output buffer 35 of the inference unit 30, the host computer 10 executes the operation in accordance with the aforementioned equation (1) or other consequence processing (e.g. MAX operation and defuzzification) to obtain a final inference result in accordance with the rule cell 1.

As described above, since a plurality of rule cells are previously stored in the rule memory 22, the host computer 10 can start any given inference only by applying a rule cell address for designating a rule cell related to an inference required to be executed and by outputting the system clear signal SCLR. Further, in response to the end signal END indicating that inference processing in accordance with a designated rule cell has been completed, the host computer 10 may read only an inference result from the output buffer 35. Similarly, when another inference is required to be executed, the host computer 10 writes a rule cell address for designating a rule cell to be executed in the register 23 and outputs the system clear signal SCLR. As described above, the host computer 10 can switch inferences required to be executed in sequence at high speed. Here, where an inference in accordance with each rule cell is considered as one task, the host computer 10 can execute a plurality of tasks in sequence without interruption. In addition, since the tasks can be switched by rewriting only the address data in the rule cell address register 23, it is possible to realize a high speed task switching operation.

The inference unit 30 executes an inference operation in accordance with a single rule cell at an extremely high speed. In general, since controlled objects do not require a high speed inference, it is possible to execute a plurality of fuzzy inferences for controlling a plurality of objects by a single fuzzy inference system, because the above-mentioned multitask processing is enabled.

(6) Inference Unit (Pipeline Processing)

The detailed configuration and operation of the inference unit 30 shown in FIG. 6 will be described hereinbelow with reference to the timing chart shown in FIG. 11 on the assumption that the path codes with respect to the output variable y1 shown in FIG. 9 are supplied (a cell address of the rule cell 1 is set to the address register 23).

The count value of the path address counter 24 is incremented by the leading edges of the clock signals CK. That is, after having been reset by the clear signal CLR, when the count value of the counter 24 becomes 1 by the first leading edge of the clock signal CK, the first path code of the rule cell 1 is read from the rule memory 22 and then given to the register 40. The register 40 latches the fed path code at the leading edge of the timing signal TC0. The IV code of the latched pass code is fed to the input buffer 31.

This input buffer 31 has memory areas where input data for all the input variables xi (i=1 to M) used for all the rule cells 1 to N can be stored, and further an address is determined for each area of each input variable xi.

On the other hand, the host computer 10 reads input values (input data) concerning input variables xi from sensors or input devices (all not shown) periodically, whenever the input values have changed, or at appropriate timings, and writes these input data in the corresponding areas of the input buffer 31 via the bus. In general, these input data are written without synchronism with the inference operation of the inference unit 30. It is possible to release the host computer 10 from the above-mentioned writing processing, by providing other specific hardware for reading input data from sensors and further writing the read data at the corresponding areas in the input buffer 31.

In any case, the input data stored in the input data memory areas concerning corresponding input variables xi are always updated in the input buffer 31. When the IV code is supplied to the input buffer 31, input data (expressed by xi in FIG. 6) written in the memory area whose address is designated by the IV code (that is, in the input data memory area of the input variable xi designated by the IV code), is read and then fed to the register 41.

Thereafter, the OP codes of the path code latched by the register 40 and the input data xi outputted from the input buffer 31 are latched by the succeeding stage register 41 at the timing of the leading edge of the timing signal TC1. The code OP1 of the OP code and the input data xi latched by the register 41 are supplied to the truth value generator 32.

Although the practical configuration of the truth value generator 32 will be described later, the truth value generator 32 is provided with such a function as to calculate and output a truth value ai in the membership function designated by the inputted code OP1 when an input data xi is given. The truth value ai is fed to the succeeding stage register 42.

The codes OP2 to OP4 of the OP code latched by the register 41 and the truth value ai outputted from the truth value generator 32 are latched by the succeeding register 42 at the timing of the leading edge of the timing signal TC2. The code OP2 and the truth value data ai latched by the register 42 are supplied to the MIN operation section 33.

The MIN operation section 33 comprises a MIN circuit, a MIN register, and a decoder for controlling these circuits in accordance with the code OP2. The MIN circuit compares the input data with the data latched in the MIN register. On the other hand, since the code OP2 is composed of two bits as already described, the MIN operation section 33 is controlled by the code OP2 as follows:

If the code OP2 is (1 0), the MIN operation unit 33 latches the input data in the MI register.

If the OP2 code is (0 0), the input data is compared with the data latched in the MIN register, and the smaller data is latched in the MIN register.

If the code OP2 is (0 1), the input data is compared with the data latched by the MIN register, and the smaller data is outputted to the succeeding stage.

If the code OP2 is (1 1), the input data is outputted to the succeeding stage as it is.

With reference in FIG. 9, for instance, since the code OP2 is (1 0) in the path code No.(1), the input data is latched by the MIN register the code OP2 is (0 1) in the path code No.(2), the input data is compared with the data previously latched in the MIN register and the smaller data is outputted. By the above operation, the MIN operation for two data is completed (See Rule 1).

Similarly, since the code OP2 is (1 0) in the path code No. (3), the input data is latched by the MIN register. Since the code OP2 is (0 1) in the path code No. (4), the input data is compared with the data previously latched in the MIN register and the smaller data is outputted. By the above operation, the MIN operation for two data is completed (see Rule 2).

Further, since the code OP2 is (1 0) in the path code No.(5), the input data is latched in the MIN register. Since the code OP2 is (0 0) in the path code No.(6), the input data is compared with the data previously latched in the MIN register, and the smaller data is latched in the MIN register. Since the code OP2 is (0 1) in the path code No.(7), the input data is compared with the data latched in the MIN register, and the smaller data is outputted. By the above operation, the MIN operation of three data is completed (See Rule 4).

As described above, the MIN operation section 33 executes a MIN operation for a plurality of path codes, and outputs the operation result $a_k$ or $a_{kl}$ (k=NL to PL, l=1, 2, ... ) when the MIN operation has been completed (when OP =(0 1)).

The codes OP3 and OP4 latched by the register 42 and the MIN operation result (outputted only when the MIN operation has been completed as described above) of the MIN operation section 33 are latched by the succeeding stage register 43 at the timing of the leading edge of the timing signal TC3. The code OP3 latched by the register 43 and the MIN operation result data (if obtained) are supplied to the MAX operation section 34.

The MAX operation section 34 comprises a MAX circuit, a MAX register and a decoder for controlling these circuits in accordance with the code OP3. The MAX circuit compares the input data with the data latched in the MAX register. Since the code OP3 is composed of two bits as already described, the MAX operation section 34 is controlled by the code OP3 as follows:

If the code OP3 is (1 0), the MAX operation section 34 latches the input data in the MAX register.

If the code OP3 is (0 0), the input data is compared with the data latched in the MAX register, and the larger data is latched in the MAX register.

If the code OP3 is (0 1), the input data is compared with the data latched by the MAX register, the larger data is outputted to the succeeding stage.

If the code OP3 is (1 1), the input data is outputted as it is.

With reference to FIG. 9, for instance, since the code OP3 is (0 0) in the path code No.(1), the input data is compared with the MAX register data, and the larger data is latched by the MAX register. In this case, however, since the preceding stage MIN operation section 33 outputs no data (i.e. the input data is zero) and the MAX register is kept cleared (i.e. the data is zero), nothing happens.

Since the code OP3 is (1 1) in the path code No. (2), the input data a kl (k=NM in Rule 1) is outputted as it is ($a_{NM}$ in rule 1; see FIG. 4).

Since the code OP3 is (0 0) in the path code No. (3), the input data is compared with the MAX register data $a_{kl}$, and the larger data is latched by the MAX register. In this case, however, since the MIN operation section 33 outputs no signal (i.e. the input data is zero), the data $a_{kl}$ is kept latched in the MAX register.

Since the code OP3 is (1 0) in the path code No. (4), the data akl is latched in the MAX register.

Since the code OP3 is (0 0) in the path code No. (5), and there exists no input data, the MAX operation section 34 is kept unchanged. Again, since the code OP3 is (0 0) in path code No. (6), and there exists no input data, the MAX operation section 34 is kept unchanged.

Since the code OP3 is (0 1) in the path code No. (7), the input data $a_{k2}$ is compared with the MAX register data $a_{kl}$, and the larger data is outputted as data $a_k$. Here, the MAX operation for two data is completed (MAX operation for rules 2 and 4).

Since there are many rules which require no MAX operation as in rule 1 or 3, in this case the MAX operation section 34 serves to only pass data.

At the timing of the leading edge of the timing signal CT4, the code OP4 latched in the register 43 and the output $a_k$ (if any) of the MAX operation section 34 are latched by the register 44.

Since the code OP4 is one bit, the code OP4 is set to "1" when the operation result is outputted from the MAX operation section 34 (when OP3 is (0 1)) or when the MIN operation result is outputted through the MAX operation section 34 (when OP3 is (1 1)). The code OP4 is set to "0" in those cases other than the above. That is, the code OP4 is set to "1" only when the label of the consequent membership function changes.

The code OP4 is inputted to the output address counter 36. The counter 36 is then reset in response to the clear signal CLR as already described above, and counts the code OP4 when the code OP4 is "1".

The output buffer 35 shown in FIG. 6 includes seven areas corresponding to all seven consequent labels are stored. These areas are designated by count values (addresses) of the counter 36. When the inference result $a_k$ is outputted from the MAX operation section 34 and latched by the register 44, the count value of the counter 36 is incremented, and the data $a_k$ latched by the register 44 is stored at an area of the output buffer 35 designated by the count value of the counter 36.

In the case where the number of labels of the consequent membership functions is six or less for a rule group which constitutes one rule cell, six or less data $a_k$ corresponding thereto are stored in the output buffer 35. Further, in the case where rules with respect to two or more output variables are included in one rule cell, fourteen or more data areas, for instance, are to be provided for the output buffer.

Since the path address counter 24 of the control unit 20 counts the leading edges of the clock signal CK as already described and outputs signals for addressing the path codes in a designated rule cell in sequence, the path codes are supplied to the register 40 in sequence at the same period as that of the clock signal CK. Further, the period of the timing signals TC0 to TC4 is the same as that of the clock signal CK. Therefore, as depicted in FIG. 11, the registers 40 to 44 latch inputted codes and data in sequence at each period of the clock signal, for reading the input data and executing truth value calculations, MIN operations and MAX operations.

Further, various processings occur with respect to a specified path code flow in the rightward direction in FIG. 6 every clock period. Therefore, it is possible to realize perfect pipeline processing having no wasted time (e.g. waiting time) at any path code and at any processing stage, because both data to be processed and OP codes for controlling processing to be executed at each stage, are included together in the path code.

After the processing for one rule cell has been completed, a special code (1 0 1 1) (OP2, OP3) included in the end code, as previously described, is detected by the controller 21, and the end signal END is applied to the host computer 10. The host computer 10 reads the inference operation result stored in the output buffer 35 from the bus 11. In this case, since the output buffer 35 is provided at the final stage, the host computer 10 can easily read the inference result data.

(7) Truth Value Generator

The truth value generator 32 can be configured into any desired architecture or construction. In this embodiment, however, the configuration has been adopted such that any membership functions can be designated by the above-mentioned code OP1 and also high speed operation is enabled.

Figure 12:
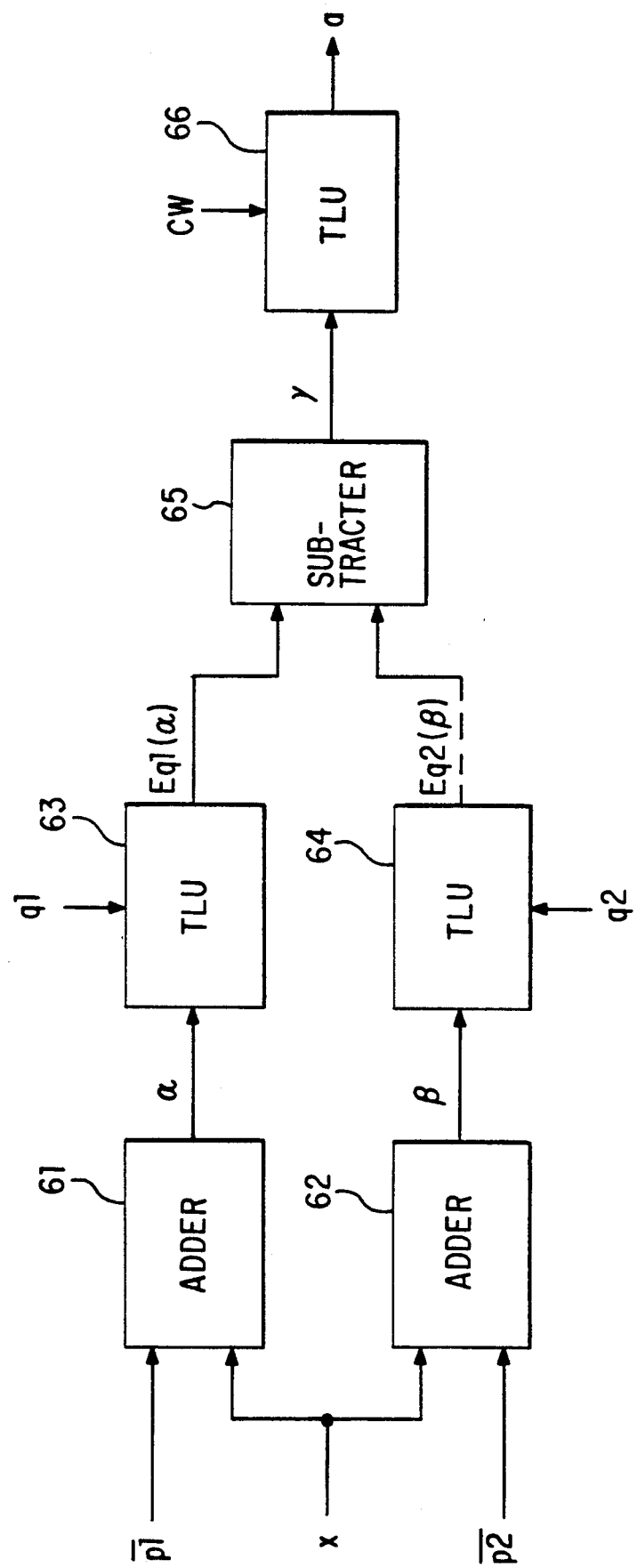
FIG. 12 is a block diagram showing a practical truth value generator.

FIG. 12 shows an example of a practical configuration of the truth value generator 32. The example comprises two adders 61 and 62, two table look-up units 63 and 64 for forming membership functions, a subtracter 65, and a table look-up unit 66 for adjusting weight coefficients.

The code OP1 is composed of codes q1 and q2 for selecting the kind (shape) of membership functions for the TLU's 63, 64; codes p1 and p2 are provided designating locations of membership functions of the selected kind (locations on the input variable axis), and a code CW is supplied to TLU 66 for determining weight.

An assumption is made that input x denotes an input variable value and is expressed in 8 bits (0 to 255) to explain the operation by way of more practical examples.

The input value x is given to the two adders 61 and 62. A complement $\overline{p1}$ of the code $\overline{p1}$ is given to the adder 61 and a complement $\overline{p2}$ of the code p2 is given to the other adder 62. The two adders 61 and 62 execute arithmetic operations in accordance with the following equations (2) and (3) and output the operation results α and β, respectively:

$$\alpha = 255 + X - p1 \quad (2)$$

$$\beta = 255 + X - p2 \quad (3)$$

where α and β are expressed by nine bits (0 to 511)

Since the two adders 61 and 62 execute the above arithmetic operations, it is also possible to adopt another operation circuit including an adder and a subtracter in combination, instead of the adders 61 and 62, in such a way that the codes p1 and p2 can be inputted.

These arithmetic operation results are inputted to the table look-up units 63 and 64, respectively. Each table look-up unit 63 or 64 is respectively provided with a function memory (e.g. ROM) where data table representatives of functions as shown in FIGS. 13a to 13e are previously stored.

It is preferable that a single function memory (not shown) is used in common for both of the units 63 and 64; however, it is also possible to allow respective units 63 and 64 to includes its own separate function memory.

A plurality of functions (Q) are stored in the function memory. The functions are expressed by $E_r$ (r=1 to Q) where the abscissa (variable α or β) of each of the function $E_r$ is expressed by nine bit numbers (0 to 511) and the ordinate is expressed by eight bit numbers (0 to 255).

Figure 13A:
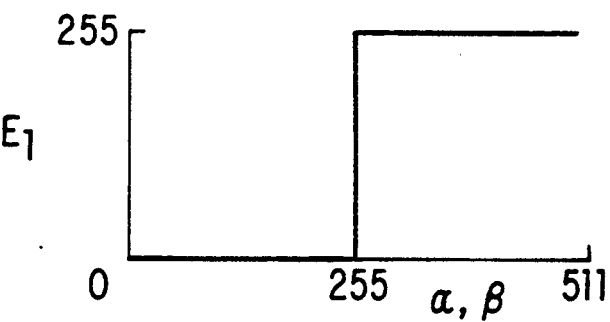
FIGS. 13a to 13e are graphical representations showing examples of functions stored in a memory of a table look-up unit.

FIG. 13a shows a step function such that the function $E_1$ has a minimum value (E=0) within the range between the minimum value and the middle value (0 to 255) and has a maximum value (E=255) within the range between the middle value and the maximum value (256 to 511).

Figure 13B:
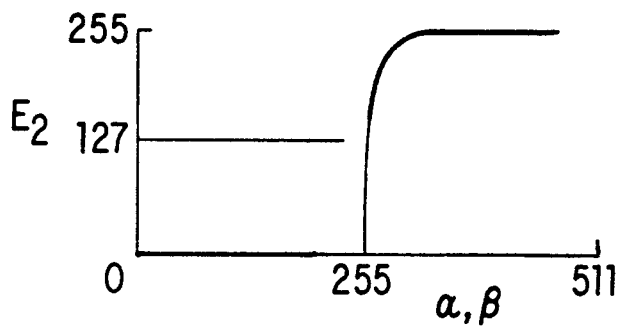
Figure 13C:
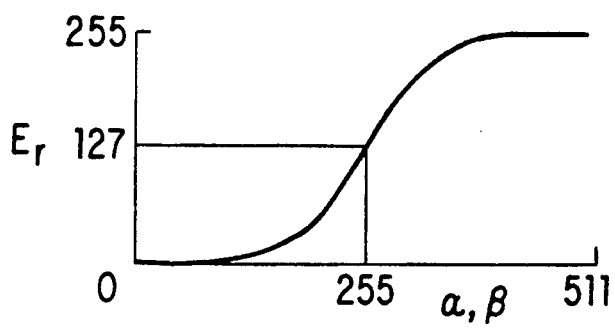

FIG. 13b shows a function $E_2$ which increases smoothly but sharply from the minimum value to the maximum value when the variable increases near the middle value (=255).

Figure 13D:
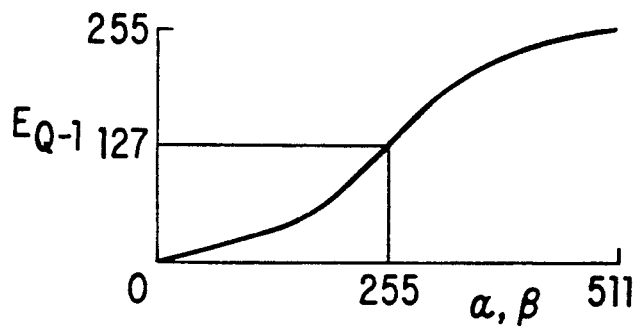

In (Q-2) pieces of functions $E_r$ from $E_2$ to $E_{Q-1}$ as shown in FIGS. 13b and 13d, the function value increases smoothly and continuously with increasing variable from the minimum value to the maximum value at different increasing rates. That is, the function value increases relatively sharply in the function $E_2$ but very gently in the function $E_{Q-1}$ over the entire range between the minimum value and the maximum value of the variable. The rate of increase decreases with increasing r value; however, the function value of each of all functions $E_2$ to $E_{Q-1}$ reaches the middle value (=127) when the variable reaches the middle value (=255).

Figure 13E:
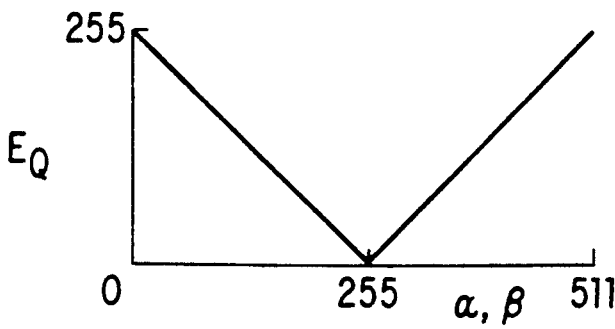
Figure 14A:
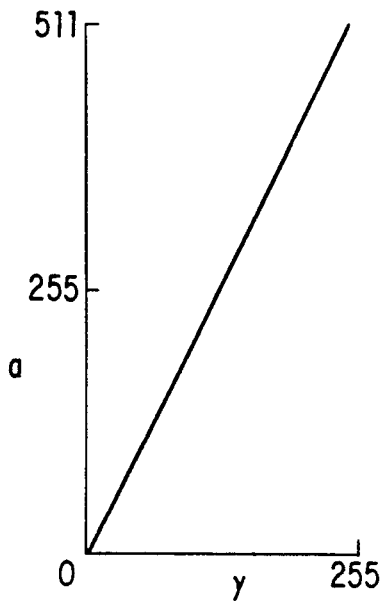
FIGS. 14a to 14d are graphical representations showing examples of functions stored in memory of another table look-up unit.
Figure 14C:
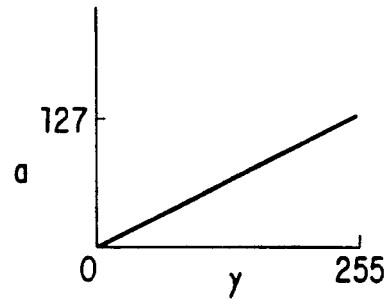
Figure 14B:
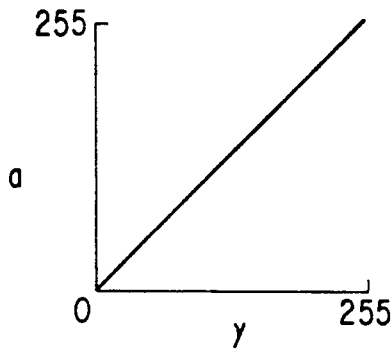
Figure 14D:
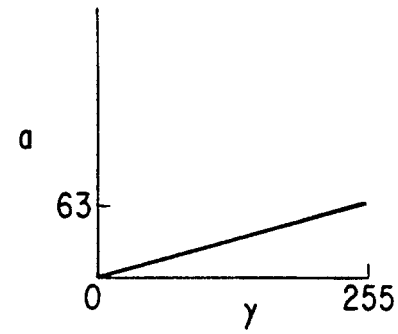

FIG. 13e shows a function $E_Q$ which decreases linearly from the maximum value to the minimum value when the variable increases from the minimum value to the middle value but increases linearly from the minimum value to the maximum value when the variable increases from the middle value to the maximum value.

Codes q1 and q2 are fed to the two table look-up units 63 and 64 (FIG. 12), respectively, to select any one of the functions of these Q kinds (i.e. where r is determined). From the look-up table unit 63, the function value $E_{q1}(\alpha)$ where α denotes the input variable) is extracted on the basis of the function $E_{q1}$ that is selected by the code q1 from the function table, and is then outputted. In the same way, a function value $E_{q2}(\beta)$ is retrieved from the look-up table unit 64, (where β denotes the input variable) on the basis of the function $E_{q2}$ selected by the code q2 from the function table.

These function values $E_{q1}(\zeta)$ and $E_{q2}(\beta)$ outputted from these table look-up units 63 and 64 ar then supplied to the subtracter 65 which then executes the following arithmetic operation:

$$v = E_{q1}(\alpha) - E_{q2}(\beta) \quad (4)$$

The operation of the adders 61 and 62, the table look-up units 63 and 64 and the subtracter 65 will be explained in more detail with reference to FIGS. 15a and 15b.

Figure 15A:
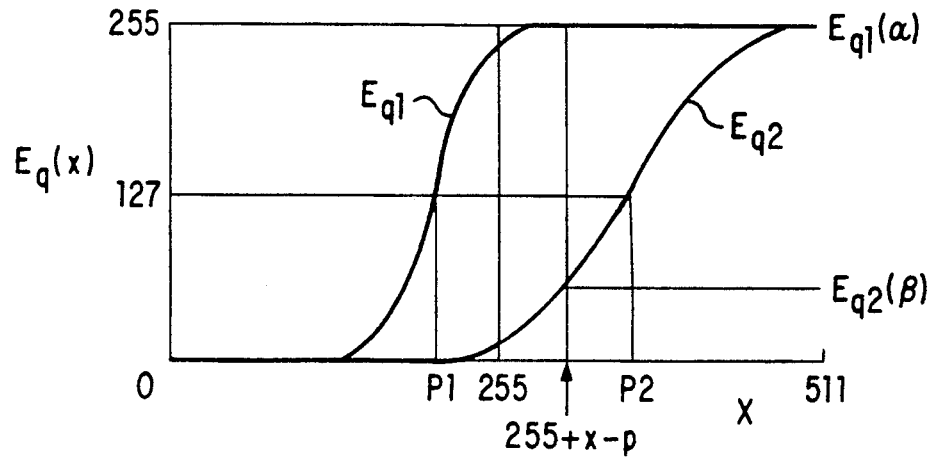
FIGS. 15a and 15b are graphical representations for assistance in explaining the truth value operation process.

FIG. 15a shows two functions $E_{q1}$ and $E_{q2}$ selected by the codes q1 and q2. These functions $E_{q1}$ and $E_{q2}$ are shifted on the variable axis X on the basis of the codes p1 and p2, respectively. The function $E_{q1}$ is shifted in such a way as to be $E_{q1}(p1)$=middle value (=127); the function $E_{q2}$ is shifted in such a way as to be $E_{q2}(p2)$=-middle value (=127). Function values of these functions are $E_{q1}(\alpha)$ and $E_{q2}(\beta)$ when the variables X=255+x−p (p=p1 or p2), respectively.

Figure 15B:
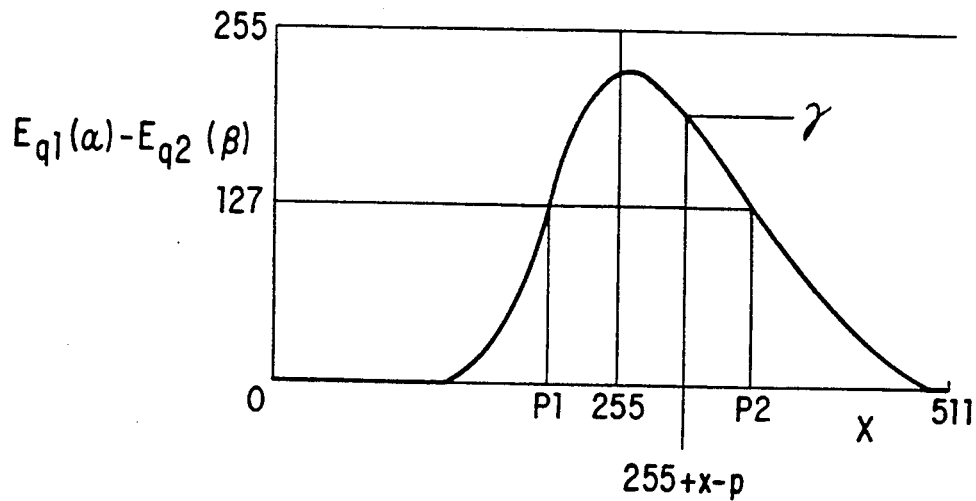

FIG. 15b shows a graph of $E_{q1}(\alpha) - E_{q2}(\beta)$ obtained when x is changed. As understood by the drawing, $E_{q1}(\alpha) - E_{q2}(\beta)$ is similar to a normal (Gaussian) distribution in shape. This graph becomes mirror symmetrical only when q1=q2. As described above, the adders 61 and 62, the table look-up units 63 and 64 and the adder 65 execute operations to obtain a function value v on the basis of the membership functions as shown in FIG. 15b whenever an input x is given. In this case, the codes p1 and p2 determine the location of the membership function on the variable axis, and the codes q1 and q2 select the shape of the membership function.

The value v obtained as described above is given to the table look-up unit 66, which is also provided with a function memory (not shown) for storing data tables representative of linear functions with different gradients as shown in FIGS. 14a to 14d (all passing through the origin). One of these linear functions is selected by the code CW. On the basis of the selected linear function, a function value a is retrieved according to any given input v, read, and outputted as a final truth value a. In other words, the table look-up unit 66 has such a function that a truth value a is calculated by multiplying an input v by a coefficient according to the code CW.

The above-mentioned operation executed by the truth value generator can be expressed by an equation as follows:

$$a = CW \cdot [E_{q1}(255+x-p1) - E_{q2}(255+x-p2)] \quad (5)$$

Figure 16A:
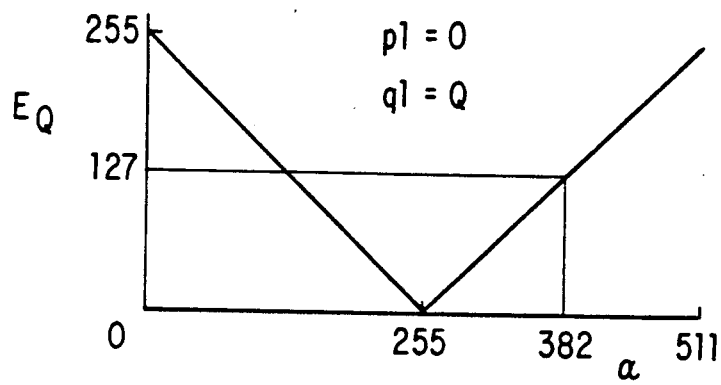
FIGS. 16a and 16b are graphical representations for assistance in such an operation that inputs are outputted as they are through the truth value generator.
Figure 16B:
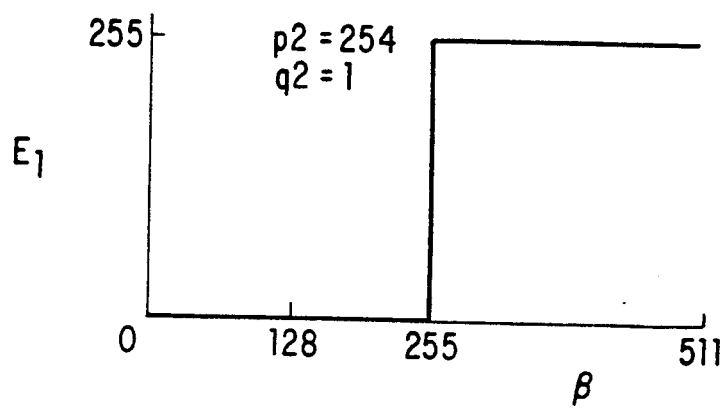

The truth value generator, as described above, can be provided with such a function that the inputs x can be outputted as they are (a = x) by setting special codes as shown in FIGS. 16a and 16b as follows:

p1=0, q1=Q p2=254, q2=1

By substituting the above values into the equations (2) and (3), the following values are obtained.

$$\alpha = 255 + x - p1 = 255 + x \quad (6)$$

$$\beta = 255 + x - p2 = 1 + x \quad (7)$$

For instance, if x=127 is used in the above equation (6), then α=255+127=382. In the function $E_{q1}=E_Q$ shown in FIG. 16a $E_Q(382)$=127. Further; if x=127 in the above equation (7), then $\beta = 1 + 127 = 128$. In the function $E_{q2} = E_1$ shown in FIG. 16b, $E_1(128) = 0$. Therefore, when $E_{q1}(\alpha) = 127$ and $E_{q2}(\beta) = 0$ are substituted into the equation (4), $v = 127$ can be obtained.

Further, in the table look-up unit 66, when the code CW is selected so that a multiplication of a coefficient 1 can be executed and $a = r = 127$ can be obtained. In this case $a = x$ can be established all over the range where the input x lies between 0 and 255.

For example, when the input x is a truth value no truth value generating function is required for the truth value generator, and therefore the input x must be passed therethrough as it is, by use of special codes.

In the above embodiment, one membership function is formed by two functions $E_{q1}$ and $E_{q2}$ Therefore, it is possible to increase the degree of freedom of selecting the kind of membership functions. Of course, $q1 = q2$ can also be set.

Alternatively, it is possible to previously store membership functions of various kinds such as normal distribution, linear functions having different gradients (passing through the origin), etc. in the function memory. In this case, when an input is given, the function value corresponding to the input value is read on the basis of a selected membership function, and then outputted as a truth value. The table look-up unit for providing a weight is not necessarily required.

In the block diagram shown in FIG. 12, each of the blocks 61 to 66 is configured by hardware in order to increase the speed of the truth value generating processing. However, it is of course possible to realize the above-mentioned truth value generating function by software as well.

(8) Code Formation

The path codes and their functions have already been described in detail in order to explain the entire system operation. However, the procedure for forming the path codes (codes OP2 and OP3 in particular) on the basis of a group of inputted rules will be described below. The path code formation processing can be executed by the host computer 10 or another computer system.

Figure 17:
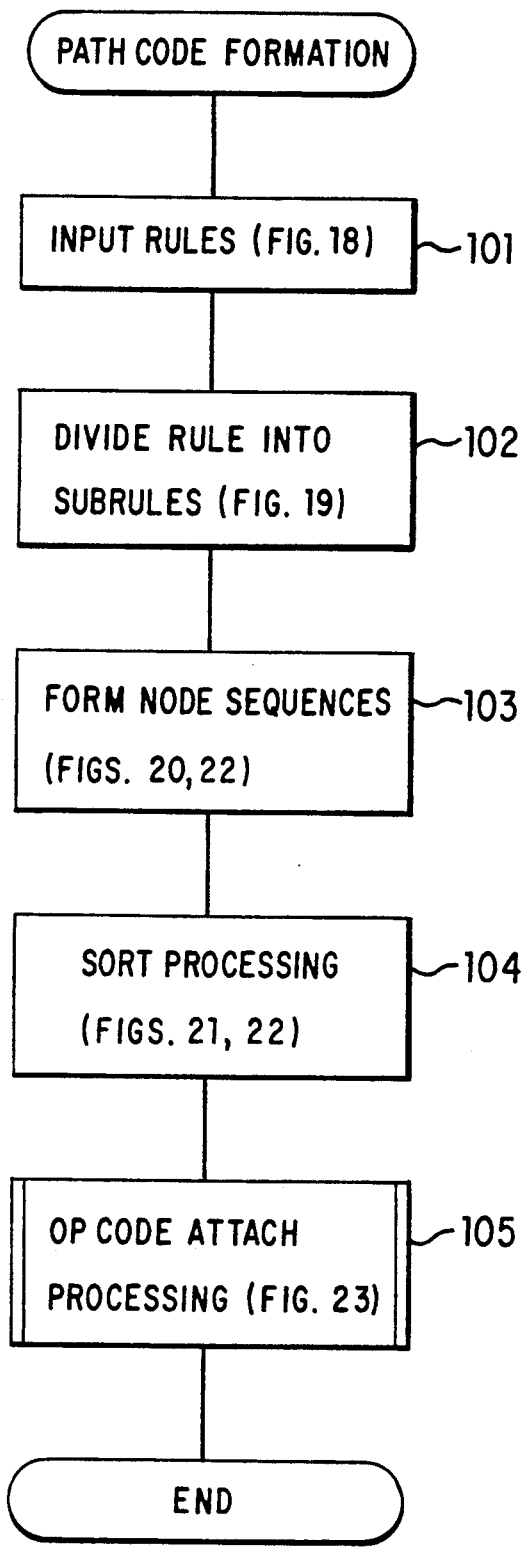
FIG. 17 is a flowchart for assistance in explaining a procedure of path code formation processing.

FIG. 17 is a flowchart showing a procedure of path code formation processing.

First, all the rules are inputted (in step 101). Here, an assumption is made that only rules with respect to the output variable y1 are inputted for simplification. An example of the inputted rules are shown in FIG. 18. R1 denotes a rule 1, R2 denotes a rule 2 and so on. These rules 1 (R1) to rule 4(R4) are the same as already explained. The antecedent membership functions can be determined by the code OP1 as described already. Here, however, these functions are expressed by labels NL to PL.

The inputted rules are then divided into subrules (unit rules), respectively (step 102). FIG. 19 shows an example of the these divided subrules. And, as shown in FIG. 19, a path number pi (i = 1, 2, 3, . . . ) (the same symbol i as that of the input variable xi is used, independently) is attached to each subrule.

Figures 20, 21:
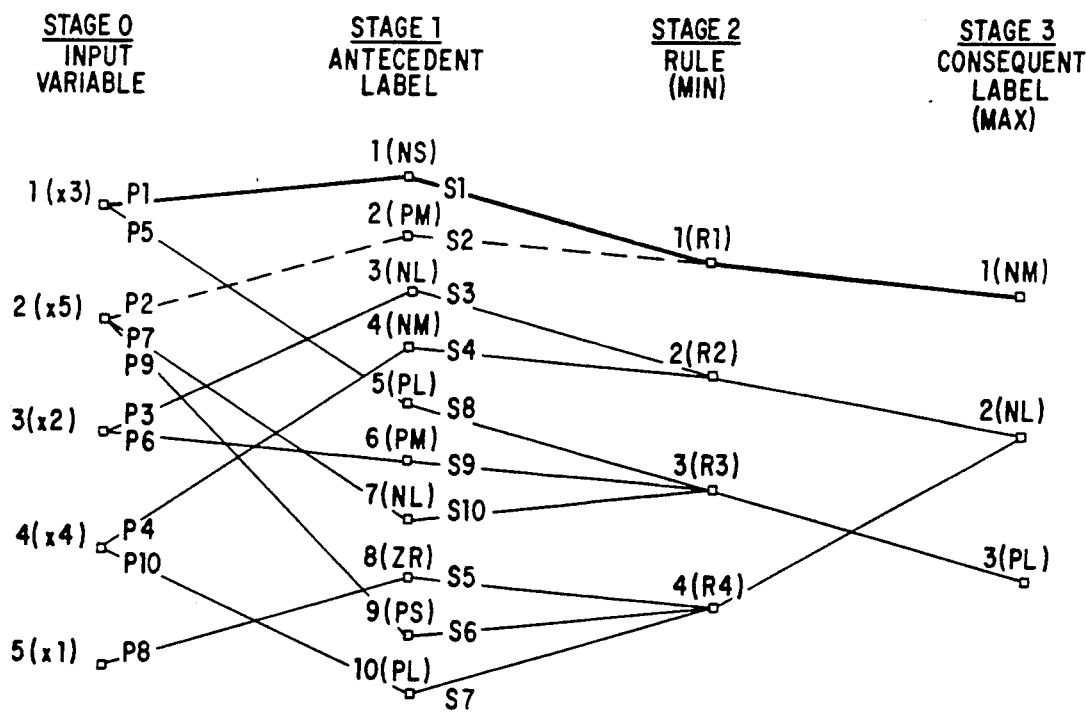
FIG. 20 shows an example of a node sequence obtained from a subrule group.
FIG. 21 shows a graphical representation showing node sequences.

Each of the divided subrules is expressed in the form of a node sequence as shown in FIG. 20 (step 103). FIG. 21 is a graphical representation showing node sequences.

In this embodiment, four stages 0 to 3 and each stage, including plural nodes, which correspond to a stage of processing are determined. As depicted in FIG. 21, a path is a line obtained by connecting nodes at adjacent stages. The stage 0 relates to inputting, and each node is provided for each input variable, which is also shown at the node for referral. The stage 1 relates to truth value generation, and each node is provided to each subrule, of which the label of the antecedent membership function is also shown at the node for referral. The stage 2 node corresponds to MIN operations, and each node is provided for each rule which is shown at the node for referral. The stage 3 node corresponds to MAX operations, and each node is provided for each label of the consequent membership function, which is also shown at the node for referral.

At each stage, a node number is attached to each node so that different nodes are attached to different node numbers. With the node numbers, each node sequence is re-expressed in the form of a sequence of node numbers such that the node number of the node in the last stage comes first and the node number of the node in the stage before the last stage follows, etc., as shown in FIG. 20.

For instance, the path No. $P_1$ is attached to the node sequence (1, 1, 1, 1,) denoting a subrule of $x3 = NS \rightarrow y1 = NM$ in rule 1, as shown by thick lines in FIG. 22. In FIG. 22, the node sequence of path No. 2 is shown by dashed lines; and the node sequences of path Nos. $P_3$ to $P_7$ are shown by solid lines to facilitate understanding of the node sequences.

Thereafter, the node sequences are rearranged so that the node sequences with the same node number at stage 3 (in other words, the node sequences with the same consequent label) are at successive positions, and, among them, the node sequences with the same node number at stage 2 (in other words, the node sequences denoting subrules of the same rule) are at successive positions. This is easily accomplished by using well known algorithms; for example, a quick-sort algorithm can be used in accordance with so-called dictionary ordering.

FIG. 22 shows the result sorted as described above. In FIGS. 21 and 22, sorted path Nos. $S_i$ (the number of node sequences after having been sorted) are shown (however, i or $S_i$ will not be related to i of input variables ki as already described). The number of $S_i$ are the same as number shown in FIGS. 7 and 9.

Finally, IV codes and OP codes are attached to each node sequence to complete the path code formation (in step 105).

Figure 23:
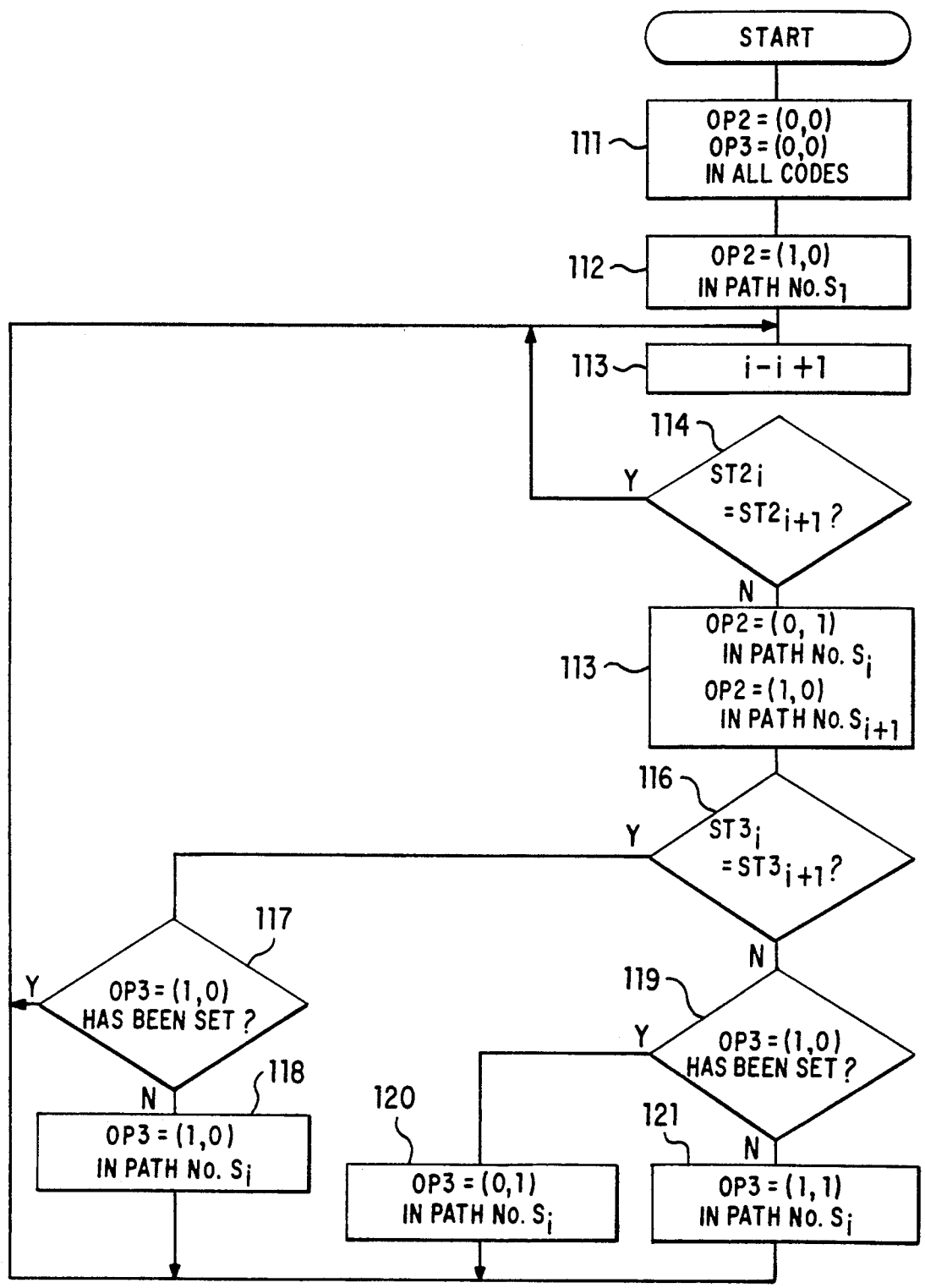
FIG. 23 is a flowchart for assistance in explaining a procedure of OP-code supplying processing.

FIG. 23 shows a procedure of the OP code attaching processing.

The IV code represents an address in the input buffer 31 in correspondence to the kind of the input variable xi, and therefore, is defined by the input variable xi unconditionally. Further, the code OP1 is a set of codes p1, p2, q1, q2 and CW to determine the antecedent membership function. These codes have been inputted whenever the rules are set. Therefore, the process of attaching the IV code and the code OP1 is not described here. Only the process of attaching the codes OP2 and OP3 will be described below with reference to FIG. 23 together with FIG. 21 in which the codes OP2 and OP3 that are attached for convenience are also shown.

To unify the description, the node symbols (R1, R2, and R3) at stage 2 of the node sequences of No.$S_i$ are represented by $ST2_i$. In the same way, the node symbols (NL, NM, . . . , PL) at stage 3 of the node sequences of No.$S_i$ are represented by $ST3_i$.

In the following description, Nos.$S_i$ are also referred to as path numbers. These node symbols are of course represented by node numbers within the computer.

Each of the codes OP2 and OP3 is composed of start and end bits S and E, and therefore represented by (S, E).

As already described, (S, E)=(1, 0) represents a start of operation processing; (S, E)=(0, 0) represents a continuation of operation processing, (S, E)=(0, 1) or (1, 1) represents an end of operation processing to output the operation results.

In FIG. 23, all the codes OP2 and OP3 at stages 2 and 3 are once set to (0, 0) (in step 111). In the succeeding processing, the codes OP2 and OP3 are changed from (0, 0), (0, 1) or (1, 1).

The code OP2 of the first path number $S_1$ is set to (1, 0) (in step 112), and then the path number $S_i$ is incremented (in step 113). Control checks whether the node symbol $ST2_i$ at stage 2 of the node sequence of the path number $S_i$ is equal to the node symbol $ST2_{i+1}$ at stage 2 of the node sequence of the path number $S_{i+1}$ (in step 114). That is, a change of the node symbol at stage 2 is checked. If the node symbol does not change, the path number is incremented (returns to step 113). For instance, the node symbol 3(R3) will not change between path number S9 and path number S8 and between S9 and S10.

If the node symbol at stage 2 changes, OP2=(0, 1) is set in the node sequence of path number $S_i$, and OP2=(1, 0) is set in the node sequence of the path number $S_{i+1}$ (in step 115). For instance, since the node symbol at stage 2 of the path number S2 is 1(R1) and the node number at stage 2 of the path number S3 is 2(R2), there exists a change in the node symbol. Further, there exists a change in the node symbol at stage 2 between the path numbers S4 and S5.

As described above, when the node symbol changes at stage 2, usually some processing is necessary at stage 3. At stage 3, control checks whether there exists a change between the node symbol $ST3_i$ of the path number Si and the node symbol $ST3_{i+1}$ of the path number $S_{i+1}$ (in step 116).

If there exists no change between the two, control checks whether the code OP3=(1, 0) has been set with respect to the unchanged node symbol $ST3_i$ (in step 117). If already set, control returns to step 113. If not yet set, control sets OP3=(1, 0) in the path number Si (in step 118). For instance, OP3=(1, 0) is attached in the path number $S_4$.

Further, even when there exists a change at the stage 3 between the node symbols $ST3_i$ and $ST3_{i+1}$, control checks whether OP3=(1, 0) has already been set with respect to the same node symbol as $ST3_i$ (in step 119). If OP3=(1, 0) has already been set, OP3=(0, 1) is set in the path number $S_i$ (in step 120), which corresponds to the path number $S_5$, for instance. If OP3=(1, 0) is not yet set in the node symbol the same as that for $ST3_i$, OP3=(1, 1) is attached to the path number $S_i$ (in step 121), which corresponds to the path number $S_2$, for instance.

As described above, the codes OP2 and OP3 as shown in FIG. 21 are determined, which are the same as those shown in FIG. 9.

With respect to the code OP4, as shown in FIG. 9, OP4=1 is attached to the node sequences of the path numbers to which OP3=(0, 1) or (1, 1) is set, and OP4=0 is attached to the other node sequences.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A data forming apparatus for forming rules supplied a fuzzy processing system comprising a plurality of processing means arranged in a predetermined sequence in such a way that outputs of front-stage processing means are inputted to rear-stage processing means, comprising:

means for dividing each of a plurality of given fuzzy rules into unit rules;

means for rearranging the divided unit rules according to the processing executed by the final stage processing means and, iteratively, according to the sort of processing executed by the processing means which is arranged one stage before the final stage, and repeating reversely toward the frontmost stage processing means until no rearranging operation is required.

2. The data forming apparatus of claim 1, which further comprises means for transforming the rearranged unit rules into control codes suitable for controlling said processing means.

3. A data forming apparatus for a fuzzy processing system having a plurality of processing stages, comprising:

means for dividing each of a plurality of fuzzy rules into unit rules, respectively;

means for transforming the divided unit rules into node sequence data, said node sequence data representing the nodal interconnection of said plurality of processing stages;

mean for rearranging said node sequence data into a sequence group to be processed simultaneously by said processing stages of said fuzzy processing system.

4. The data forming apparatus of claim 3, which further comprises means for transforming the rearranged node sequence data into other form data on the basis of a regularity of the processing sequence.

5. A data forming apparatus for forming codes supplied to a fuzzy processing system comprising a plurality of processing means arranged in a predetermined sequence in such a way that outputs of front-stage processing means are inputted to rear-stage processing means, to control said processing means, comprising:

means for rearranging a plurality of fuzzy rules from a processing standpoint at a predetermined processing means, and, iteratively, from a processing standpoint at a processing means arranged before the predetermined processing means, and repeating the above rearranging operations reversely toward the frontmost stage processing means until no rearranging operation is required; and means for transforming the rearranged fuzzy rules into smaller-bit control codes on the basis of a regularity of the processing sequence.

6. A method of forming data supplied to a fuzzy processing system comprising a plurality of processing means arranged in a predetermined sequence in such a way that outputs of front-stage processing means are inputted to rear-stage processing means, comprising the steps of:

dividing each of a plurality of give fuzzy rules into unit rules;

rearranging the divided unit rules according to the sort of processing executed by the final stage processing means and, iteratively, according to the sort of processing executed by the processing means which is arranged one stage before the final stage, and repeating reversely toward the frontmost stage processing means until no rearranging operation is required.

7. The method of forming data of claim 6, which further comprises the step of transforming the rearranged unit rules into control codes suitable for controlling said processing means.

8. A method of forming data for a fuzzy processing system, comprising the steps of:

dividing each of fuzzy plurality of rules into unit rules respectively;

transforming the divided unit rules into node sequence data connected by nodes for each stage processing; and rearranging these node sequence data into a sequence group to be processed simultaneously.

9. The method of forming data of claim 8, which further comprises the step of transforming the rearranged node sequence data into other form data on the basis of regularity of the processing sequence.

10. A method of forming data supplied to a fuzzy processing system comprising a plurality of processing means arranged in a predetermined sequence in such a way that outputs of front-stage processing means are inputted to rear-stage processing means, to control said processing means, comprising the steps of:

rearranging a plurality of fuzzy rules from a processing standpoint at a predetermined processing means, and, iteratively, from a processing standpoint at a processing means arranged before the predetermined processing means, and repeating the above rearranging operations reversely toward the frontmost stage processing means until no rearranging operation is required; and transforming the rearranged data sequences into smaller-bit control codes on the basis of a regularity of the processing sequence.

* * * * *